(12) United States Patent
Saha et al.

(10) Patent No.: US 10,027,271 B2
(45) Date of Patent: Jul. 17, 2018

(54) ROTATING ELECTRICAL MACHINE CONTROL DEVICE

(71) Applicant: AISIN AW CO., LTD., Anjo-shi, Aichi-ken (JP)

(72) Inventors: Subrata Saha, Anjo (JP); Yasuyuki Sato, Nishio (JP); Chaeduck Chon, Anjo (JP); Yuki Sugiyama, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/562,145

(22) PCT Filed: Jun. 2, 2016

(86) PCT No.: PCT/JP2016/066454
§ 371 (c)(1),
(2) Date: Sep. 27, 2017

(87) PCT Pub. No.: WO2016/195033
PCT Pub. Date: Dec. 8, 2016

(65) Prior Publication Data
US 2018/0083565 A1 Mar. 22, 2018

(30) Foreign Application Priority Data
Jun. 5, 2015 (JP) .................................. 2015-115158

(51) Int. Cl.
*G05B 11/28* (2006.01)
*H02P 27/08* (2006.01)
*H02P 6/14* (2016.01)

(52) U.S. Cl.
CPC .............. *H02P 27/085* (2013.01); *H02P 6/14* (2013.01)

(58) Field of Classification Search
CPC .......... H02P 31/00; H02P 27/08; H02P 21/00; H02M 7/48; H02M 7/538; H02M 1/32;
(Continued)

(56) References Cited

U.S. PATENT DOCUMENTS 4,779,183 A * 10/1988 Mutoh .................. H02M 7/529
318/811
5,781,423 A * 7/1998 Inarida ................ H02M 7/5395
363/131
(Continued)

FOREIGN PATENT DOCUMENTS

| JP | 2011-083068 A | 4/2011 |
| JP | 2013-132135 A | 7/2013 |
| WO | 2014/174597 A1 | 10/2014 |

OTHER PUBLICATIONS

Aug. 16, 2016 International Search Report issued in Patent Application No. PCT/JP2016/066454.

*Primary Examiner* — Rina Duda
(74) *Attorney, Agent, or Firm* — Oliff PLC

(57) ABSTRACT

A rotating electrical machine control device with an electronic control unit that is programmed to: switch a modulation method between asynchronous modulation in which switching of the inverter is controlled by modulated pulses generated based on a carrier having a first carrier frequency which is not synchronous with rotation of the rotating electrical machine and synchronous modulation in which switching of the inverter is controlled by modulated pulses generated in synchronization with rotation of the rotating electrical machine, the switching of the modulation method between the asynchronous modulation and the synchronous modulation being performed according to an operating condition of the rotating electrical machine which includes at least a rotational speed of the rotating electrical machine.

14 Claims, 15 Drawing Sheets

(58) Field of Classification Search
CPC . H02M 7/04; H02M 1/14; H02H 7/09; H02H 6/00
USPC .................. 318/599, 811, 432, 461, 471
See application file for complete search history.

(56) References Cited

U.S. PATENT DOCUMENTS

| | | | |
|---|---|---|---|
| 7,095,197 B2* | 8/2006 | Benchaib | H02P 29/50 318/432 |
| 8,222,857 B2* | 7/2012 | Kitanaka | H02P 21/0021 318/400.26 |
| 2011/0080125 A1 | 4/2011 | Shimada et al. | |
| 2012/0044017 A1* | 2/2012 | Lachartre | H04L 27/1563 329/336 |
| 2014/0225547 A1* | 8/2014 | Yokozutsumi | H02P 27/085 318/400.27 |
| 2016/0072424 A1 | 3/2016 | Yokozutsumi et al. | |

* cited by examiner

ROTATING ELECTRICAL MACHINE CONTROL DEVICE

BACKGROUND

The present disclosure relates to rotating electrical machine control devices that control an alternating current (AC) rotating electrical machine via an inverter that carries out conversion between direct current (DC) power and multi-phase AC power.

Inverters using semiconductor switching elements are often used for conversion between DC and AC. Pulse width modulation is known as a modulation method that is used to convert DC power to AC power. In pulse width modulation, pulses are generated based on the relationship in size between the amplitude of an alternating current waveform (e.g., an AC voltage waveform) as a command value and the amplitude of a triangular wave (including sawtooth wave)-shaped carrier waveform. There is a case where pulses are directly generated by digital computations rather than by comparison with a carrier. In that case as well, there is a correlation between the amplitude of an alternating current waveform as a command value and the amplitude of an imaginary carrier waveform. Pulse width modulation includes sinusoidal pulse width modulation (SPWM: sinusoidal PWM), space vector pulse width modulation (SVPWM: space vector PWM), etc. In these modulation methods, a carrier is determined according to the control period of a control device such as, e.g., the computation period of a microcomputer or the operation period of electronic circuits. That is, even if multi-phase AC power is used to drive an AC rotating electrical machine etc., the carrier has a period that does not directly correlate with the rotational speed and the rotation angle (electrical angle) of the rotating electrical machine. Neither the carrier nor the pulses that are generated based on the carrier are synchronous with rotation of the rotating electrical machine. Accordingly, modulation methods such as sinusoidal pulse width modulation and space vector pulse width modulation are sometimes called "asynchronous modulation methods."

On the other hand, modulation methods using pulses that are synchronous with rotation of a rotating electrical machine can be called "synchronous modulation methods." For example, rectangular wave modulation (single-pulse modulation) in which a single pulse is output in every period of the electrical angle of a rotating electrical machine is a synchronous modulation method. A plurality of pulses may be output in every period of the electrical angle as long as the pulses are synchronous with rotation of a rotating electrical machine. Multi-pulse modulation in which a plurality of pulses are output in synchronization with rotation of a rotating electrical machine can be performed as a synchronous modulation method. 5-pulse modulation, 7-pulse modulation, 9-pulse modulation, etc. can be used as the multi-pulse modulation.

These modulation methods are selected according to operating conditions such as required torque, rotational speed, etc. of a rotating electrical machine. In some cases, the modulation method is switched if the required torque or the rotational speed changes during operation of the rotating electrical machine. As described in Japanese Patent Application Publication No. 2013-132135, a transient current may flow when the modulation method is switched from an asynchronous modulation method to a synchronous modulation method (e.g., paragraphs 0025 to 0035 etc.). In Japanese Patent Application Publication No. 2013-132135, a certain amount of time is allowed before determining whether output of a rotating electrical machine should be limited or not, so that the output of the rotating electrical machine is not limited when a measured current is larger than a threshold for overcurrent determination due to such a momentary transient current. Semiconductor switching elements forming an inverter are required to be resistant to this transient current. However, selecting semiconductor switching elements having such characteristics prevents reduction in size of the inverter and hinders cost reduction. It is therefore preferable to reduce the maximum value (absolute value) of an alternating current that increases due to the influence of such a transient current.

SUMMARY

An exemplary aspect of the disclosure provides a technique of reducing the maximum value of the absolute value of an alternating current due to the influence of a transient current that is generated when a modulation method is switched between asynchronous modulation and synchronous modulation.

According to one aspect, in view of the above, a rotating electrical machine control device that controls an alternating current rotating electrical machine via an inverter that carries out conversion between DC power and multi-phase AC power includes an electronic control unit that is programmed to switch a modulation method between asynchronous modulation in which switching of the inverter is controlled by modulated pulses generated based on a carrier having a first carrier frequency which is not synchronous with rotation of the rotating electrical machine and synchronous modulation in which switching of the inverter is controlled by modulated pulses generated in synchronization with rotation of the rotating electrical machine, the switching of the modulation method between the asynchronous modulation and the synchronous modulation being performed according to an operating condition of the rotating electrical machine which includes at least a rotational speed of the rotating electrical machine. When the electronic control unit switches the modulation method between the asynchronous modulation and the synchronous modulation, the electronic control unit switches the modulation method through high frequency asynchronous modulation in which modulated pulses are generated based on a second carrier frequency that is a frequency higher than the first carrier frequency.

In the case where the carrier that is used as a basis to generate the modulated pulses in the asynchronous modulation has a relatively low frequency, resolution of DC-to-AC conversion is relatively low. Accordingly, pulsations (ripples) of an alternating current are larger than in the case where the carrier has a relatively high frequency. If a transition current resulting from switching of the modulation method is superimposed at a phase at which the absolute value of the alternating current is large due to the pulsation components, the absolute value of the alternating current may further increase accordingly. In the asynchronous modulation, the phases of an alternating voltage and an alternating current and the phase of modulated pulses vary depending on the alternating current period. Waveforms of the alternating voltage and the alternating voltage are therefore unstable. In other words, the maximum amplitude of the alternating current may be different among the plurality of phases, or even in the same phase, may vary depending on the period. If the transient current is superimposed on the alternating current near a peak of the waveform in a period during which the maximum amplitude of the alternating current is large, the absolute value of the alternating current increases accordingly. In the above configuration, however, the high frequency asynchronous modulation using a carrier having a higher frequency is performed when the modulation method is switched. This increases the resolution of DC-to-AC conversion. Accordingly, such pulsations as described above are reduced, and the alternating current waveforms are more stabilized. The above configuration can thus reduce the maximum value of the absolute value of the alternating current due to the influence of the transient current that is generated when the modulation method is switched between the asynchronous modulation and the synchronous modulation.

Further features and advantages will be apparent from the following description of embodiments of the rotating electrical machine control device which is given with reference to the accompanying drawings.

DETAILED DESCRIPTION OF EMBODIMENTS

Figure 1:
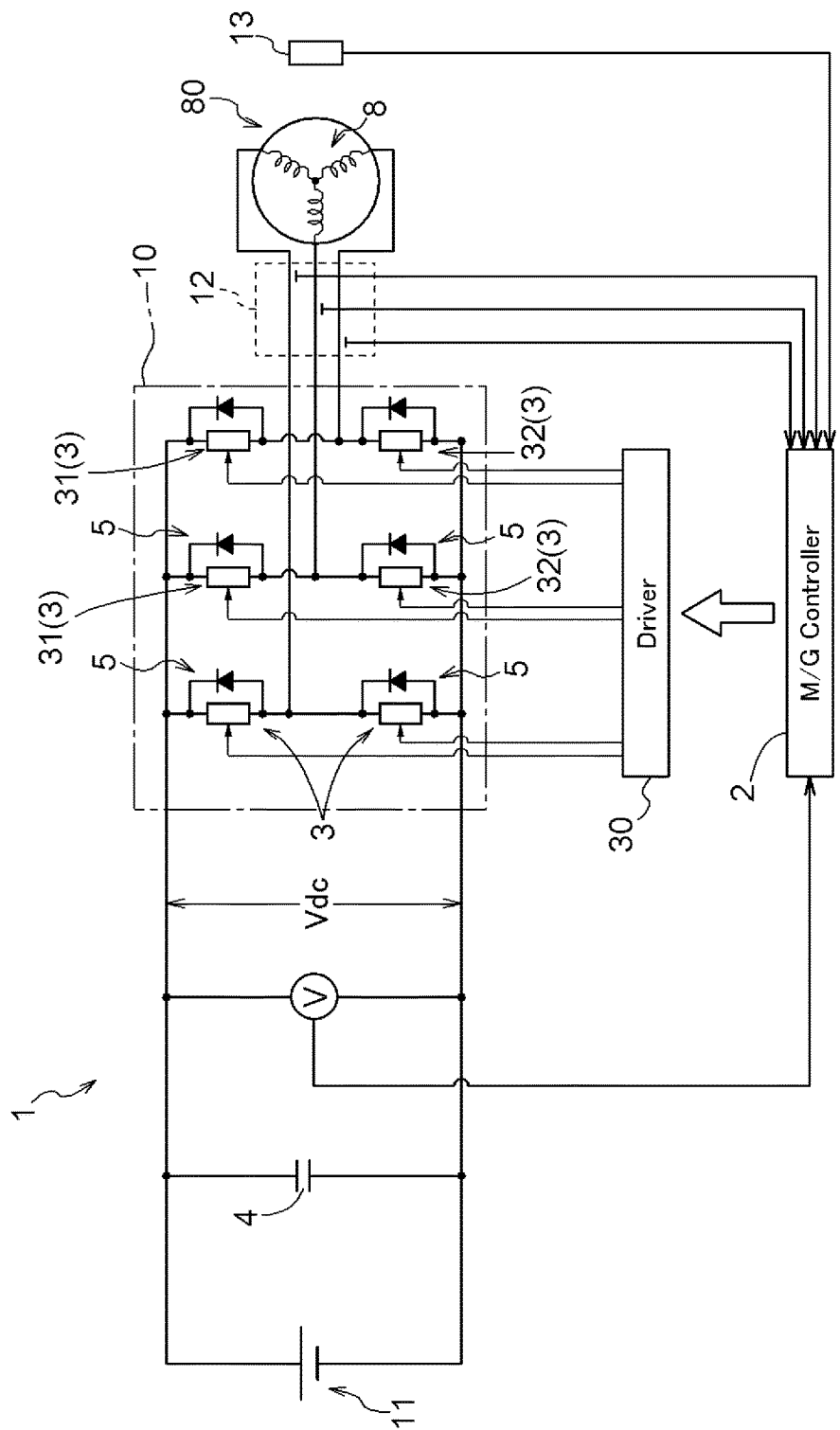
FIG. 1 is a block diagram schematically showing a system configuration including a rotating electrical machine control device.

A rotating electrical machine control device according to an embodiment will be described below based on the accompanying drawings. The block diagram in FIG. 1 schematically shows a system configuration including the rotating electrical machine control device. In the present embodiment, a rotating electrical machine 80 is a rotating electrical machine that serves as, e.g., a driving force source for vehicles such as a hybrid car and an electric car. The rotating electrical machine 80 is a rotating electrical machine that is operated with multi-phase alternating currents (in this example, three-phase alternating currents), and can function as an electric motor and an electric generator. As described below, the rotating electrical machine 80 converts electric power from a high voltage battery 11 (DC power supply) to motive power via an inverter 10 (power running), or the rotating electrical machine 80 converts a rotational driving force transmitted from an internal combustion engine or wheels, not shown, to electric power to charge the high voltage battery 11 via the inverter 10 (regeneration).

As shown in FIG. 1, a rotating electrical machine control device 2 (M/G Controller) controls a rotating electrical machine drive device 1 including the inverter 10, and controls driving of the AC rotating electrical machine 80 via the rotating electrical machine drive device 1. The inverter 10 is an electrical circuit that carries out conversion between DC power (high voltage battery 11) and multi-phase AC power. That is, the rotating electrical machine control device 2 is a control device that controls the AC rotating electrical machine 80 via the inverter 10. In the present embodiment, the rotating electrical machine control device 2 is implemented by cooperation between hardware such as an arithmetic logic processor like a microcomputer and a digital signal processor (DSP) and software such as programs and parameters. It should be understood that the rotating electrical machine control device 2 may be formed by hardware having an electrical circuit such as a logic circuit as a core.

For example, a microcomputer serving as a core of the rotating electrical machine control device 2 has a CPU core, a program memory, a parameter memory, a work memory, an A-to-D converter, a timer (counter), etc. Not all of these elements need be included in a single integrated circuit. For example, a part of these elements, such as the program memory, may be an element(s) mounted separately from the CPU core. The CPU core has an arithmetic logic unit (ALU) that is a main unit to perform various computations, an instruction register, an instruction decoder, a flag register, a general-purpose register, an interrupt controller, a direct memory access (DMA) controller, etc. The operating voltage of the rotating electrical machine control device 2 is about 3.3 to 12 [V], and the rotating electrical machine control device 2 operates with electric power that is supplied from a low voltage battery (e.g., the rated voltage is about 12 to 24 [V]), not shown.

As described above, the inverter 10 is connected to the high voltage battery 11 (DC power supply) and is connected to the AC rotating electrical machine 80 to carry out conversion between DC power and multi-phase AC power (in this example, three-phase AC power). For example, the high voltage battery 11 is a secondary battery such as a nickel-metal hydride battery and a lithium ion battery, a capacitor such as an electric double-layer capacitor, a combination thereof, etc. The high voltage battery 11 is a high-voltage high-capacity rechargeable DC power supply. The rated voltage of the high voltage battery 11 is about 200 to 400 [V]. In the case where a DC converter (DC-to-DC converter) is mounted which boosts an output voltage of the high voltage battery 11, this converter can be included in the DC power supply. This converter functions as a step-down converter in the case where electric power is regenerated to the high voltage battery 11 via the inverter 10.

A voltage on the DC side of the inverter 10 (a voltage between terminals of the high voltage battery 11 or an output voltage of the converter) is hereinafter referred to as the DC link voltage Vdc. A smoothing capacitor (DC link capacitor 4) that smooths the DC link voltage Vdc is mounted on the DC side of the inverter 10. The DC link capacitor 4 stabilizes a DC voltage (DC link voltage Vdc) that fluctuates according to fluctuations in power consumption of the rotating electrical machine 80.

As described above, the inverter 10 converts DC power having the DC link voltage Vdc to multi-phase (n-phase, where n is a natural number, and in this example, three-phase) AC power to supply the AC power to the rotating electrical machine 80. The inverter 10 also converts AC power generated by the rotating electrical machine 80 to DC power to supply the DC power to the DC power supply. The inverter 10 has a plurality of switching elements 3. It is preferable that the switching elements 3 are power semiconductor elements capable of operating at high frequencies, such as insulated gate bipolar transistors (IGBTs) or power metal oxide semiconductor field effect transistors (MOSTETs) which use silicon (Si) as a base material, silicon carbide-metal oxide semiconductor FETs (SiC-MOSFETs) or SiC-static induction transistors (SiC-SITs) which use silicon carbide (SiC) as a base material, or gallium nitride-MOSFETs (GaN-MOSFETs) that uses gallium nitride (GaN) as a base material.

IGBTs are often used as the switching elements of the inverter 10. In the case of voltage-controlled MOSFETs, on-state resistance increases and heat generation increases as the applied voltage gets closer to a withstand voltage. Bipolar transistors are not suitable for high-speed switching due to their low switching speed. IGBTs have a MOSFET structure in their input stage and a bipolar transistor structure in their output stage on a single semiconductor element so as to compensate for such disadvantages of MOSFETs and bipolar transistors. IGBTs are self turn-off elements that are driven by a voltage between the gate and the emitter and that can be turned on and off by an input signal. IGBTs are therefore high power semiconductor elements that can be switched at high speed. Because of these characteristics, IGBTs are preferable as the switching elements 3 of the inverter 10.

In recent years, such SiC semiconductors and GaN semiconductors described above have been increasingly used for the switching elements 3 of the inverter 10. Since SiC and GaN have wider bandgaps than silicon, SiC and GaN are called wide bandgap semiconductors and have high performance as semiconductor materials. Therefore, forming the inverter 10 with SiC or GaN FETs instead of silicon IGBTs can reduce the size and weight of the inverter 10 and can also reduce loss of the inverter 10. However, reduction in size of the inverter 10 means reduction in area of the inverter 10, which results in reduction in heat dissipation of the inverter 10. SiC semiconductors and GaN semiconductors have higher heat resistance than Si semiconductors. Accordingly, for example, instead of copper that has low thermal resistance but is expensive, aluminum that has higher thermal resistance than copper but is less expensive than copper, etc. can be easily used for a heatsink included in the element. The use of the inverters 10 formed with SiC semiconductors or GaN semiconductors therefore can provide improved performance of the element and thus can achieve reduction in size and weight of the element, and also can achieve reduction in cost for additional members such as a heatsink. In terms of measures against heat, however, the use of such inverters 10 may not be significantly advantageous over the inverter 10 formed with IGBTs. That is, even when the inverters 10 formed with SiC semiconductors or GaN semiconductors are used, it is important to still take measures against heat which are similar to those for the inverter 10 formed with IGBTs or to take additional measures against heat.

As one of the measures against heat, it is important to reduce a peak value (absolute value) of an alternating current due to such a transient current as described below (e.g., a transient current that is generated when a modulation method is switched, etc.). One method is to increase the switching frequency of the inverter 10 to reduce a transient current and thus reduce a peak value of an alternating current due to the transient current. However, increasing the switching frequency of the inverter 10 also increases the amount of heat that is generated by the switching elements 3 of the inverter 10. It is therefore not preferable to merely increase the switching frequency of the inverter 10. As described above, regardless of whether the switching elements 3 are IGBTs, FETs using SiC semiconductors or GaN semiconductors, etc., the inverter 10 has limited heat capacity as a device. That is, regardless of whether the switching elements 3 of the inverter 10 of the present embodiment are IGBTs using silicon as a base material or FETs using silicon carbide or gallium nitride as a base material, it is important to reduce a peak value (absolute value) of an alternating current resulting from a transient current that is generated when a modulation method is switched, etc. Accordingly, the structure of the switching elements 3 is not specified in FIG. 1. It should be understood that the present disclosure does not preclude the use of bipolar transistors as the switching elements 3.

The inverter 10 is formed by a bridge circuit including a plurality of sets of switching elements 3. The inverter 10 includes a pair of switching elements 3, namely upper stage and lower stage switching elements 3, for each of arms corresponding to stator coils 8 of each phase (in the case of three phases, U-phase, V-phase, and W-phase) of the rotating electrical machine 80. Specifically, as shown in FIG. 1, an arm corresponding to a single phase of the alternating current is formed by a series circuit of an upper stage switching element 31 and a lower stage switching element 32. Diodes (freewheeling diodes 5) are connected in parallel to each switching element 3 such that the direction from the lower stage toward the upper stage is a forward direction. In other words, the freewheeling diodes 5 are connected in parallel (antiparallel) to each switching element 3 such that the direction opposite to that in which a current flows when the switching element 3 is on is a forward direction.

Each of the switching elements 3 operates according to a switching control signal (e.g., a gate drive signal that drives the gate terminal of the IGBT or MOSFET) that is output from the rotating electrical machine control device 2. The gate drive signal that is input to the control terminal (gate terminal) of the IGBT or MOSFET that switches a high voltage requires a voltage higher than the operating voltage of electronic circuits (the microcomputer etc.) forming the rotating electrical machine control device 2. The switching control signals generated by the rotating electrical machine control device 2 are therefore converted (e.g., boosted) to voltages by a driver circuit 30 (Driver), and the voltages thus obtained are then input to the inverter 10.

As shown in FIG. 1, the rotating electrical machine 80 includes a rotation sensor 13 that detects the positions of magnetic poles of a rotor (rotation angle of the rotor) of the rotating electrical machine 80 and the rotational speed of the rotor at each time. For example, the rotation sensor 13 is a resolver etc. Currents flowing through the stator coils 8 of each phase of the rotating electrical machine 80 are detected by a current sensor 12. The present embodiment shows the configuration in which all of the three phases are measured by the non-contact current sensor 12. The rotating electrical machine control device 2 performs current feedback control based on the required torque, the rotational speed, and the modulation factor of the rotating electrical machine 80. For example, the required torque is sent from other control device, not shown, such as a vehicle control device or a vehicle travel control device, to the rotating electrical machine control device 2. The modulation factor is an index indicating the ratio of an effective value of the three-phase AC power to the DC voltage (DC link voltage Vdc).

The rotating electrical machine control device 2 generates and outputs pulses (modulated pulses) for controlling switching of the inverter 10 according to the required torque, the rotational speed, the modulation factor, etc. The modulated pulses may be generated each time, or a pulse pattern may be stored in advance in a memory etc. according to the operating conditions of the rotating electrical machine 80 or the inverter 10 so that the modulated pulses are output by DMA transfer etc. without placing a burden on the processor.

DC-to-AC conversion may be referred to as modulation and AC-to-DC conversion may be referred to as demodulation, and DC-to-AC conversion and AC to DC conversion may together be referred to as modulation and demodulation. In the present embodiment, both DC-to-AC conversion and AC-to-DC conversion are referred to as modulation. In the present embodiment, the rotating electrical machine control device 2 performs current feedback control by a vector control method to control the rotating electrical machine 80 via the inverter 10. The vector control method will be described only briefly and will not be described in detail.

First, the rotating electrical machine control device 2 computes a current command in an orthogonal vector coordinate system in vector control, based on the DC link voltage Vdc, the required torque, the modulation factor, etc. The orthogonal vector coordinate system is a coordinate system in which one axis (d-axis) is the direction of the magnetic poles of the rotor of the rotating electrical machine 80 and the other axis (q-axis) is the direction perpendicular to this axis (d-axis). Three-phase currents (actual currents) flowing through the stator coils 8 are also transformed to this orthogonal vector coordinate system based on the positions of the magnetic poles.

Computations of proportional-integral control (PI control) or proportional-integral-derivative control (PID control) are performed based on the deviation between the current command and the actual currents in the orthogonal vector coordinate system to derive a voltage command. This voltage command is inverse transformed to three-phase voltage commands based on the positions of the magnetic poles to generate modulated pulses (switching control signals) according to the selected modulation method.

Pulse width modulation (PWM) is known as a modulation method. In pulse width modulation, pulses are generated based on the relationship in size between the amplitude of an alternating current waveform (e.g., an AC voltage waveform) as an output command and the amplitude of a triangular wave (including sawtooth wave)-shaped carrier waveform. There is a case where a PWM waveform is directly generated by digital computations rather than by comparison with a carrier. In that case as well, there is a correlation between the amplitude of an alternating current waveform as a command value and the amplitude of an imaginary carrier waveform. Pulse width modulation includes sinusoidal pulse width modulation (SPWM: sinusoidal PWM), space vector pulse width modulation (SVPWM: space vector PWM), etc.

In these modulation methods, a carrier is determined according to the control period of the rotating electrical machine control device 2 such as, e.g., the computation period of the microcomputer or the operation period of the electronic circuits. That is, even if multi-phase AC power is used to drive the AC rotating electrical machine 80, the carrier has a period that is not restricted by (period that does not synchronize with) the rotational speed and the rotation angle (electrical angle) of the rotating electrical machine 80. Accordingly, neither the carrier nor the pulses that are generated based on the carrier are synchronous with rotation of the rotating electrical machine 80. Modulation methods such as sinusoidal pulse width modulation and space vector pulse width modulation are therefore sometimes called "asynchronous modulation methods."

On the other hand, modulation methods in which pulses are generated in synchronization with rotation of the rotating electrical machine 80 are called "synchronous modulation methods." For example, a modulation method called rectangular wave modulation (single-pulse modulation) is a rotation-synchronous modulation method in which a single pulse is output in every period of the electrical angle of the rotating electrical machine 80.

As described above, as an index indicating the conversion rate from a DC voltage to an AC voltage, there is a modulation factor indicating the ratio of an effective value of a line-to-line voltage of multi-phase AC voltages to a DC voltage. Typically, the maximum modulation factor for sinusoidal PWM is about 0.61 and the maximum modulation factor for space vector PWM is about 0.71. There is a modulation method having a modulation factor of greater than about 0.71. This modulation method is a modulation method with a modulation factor greater than normal modulation methods, and is called "overmodulation pulse width modulation." The maximum modulation factor for "overmodulation pulse width modulation" is about 0.78. The modulation factor of 0.78 is a physical (mathematical) limit value in DC to AC power conversion. If the modulation factor reaches 0.78 in overmodulation pulse width modulation, this pulse width modulation is rectangular wave modulation (single-pulse modulation) in which a single pulse is output in every period of the electrical angle. In rectangular wave modulation, the modulation factor is fixed to about 0.78 that is a physical limit value.

Overmodulation pulse width modulation having a modulation factor of less than 0.78 can be implemented based on the principle of either a synchronous modulation method or an asynchronous modulation method. A typical modulation method is a modulation method called discontinuous pulse width modulation (DPWM: discontinuous PWM). Although discontinuous pulse width modulation can be implemented based on the principle of either a synchronous modulation method or an asynchronous modulation method, an example using a synchronous modulation method is shown herein. Rectangular wave modulation (single-pulse modulation) is described as a modulation method in which a single pulse is output in every period of the electrical angle. However, a plurality of pulses may be output in every period of the electrical angle. In the case where a plurality of pulses are output in every period of the electrical angle, an effective period of the pulses decreases accordingly, and the modulation factor decreases. Accordingly, not only the modulation factor fixed to about 0.78 but also a desired modulation factor of less than 0.78 can be implemented by a synchronous modulation method. For example, pulses such as 9 pulses or 5 pulses may be output in every period of the electrical angle. In the present embodiment, such a modulation method is referred to as multi-pulse modulation. Multi-pulse modulation belongs to "synchronous modulation methods" as pulses are output in synchronization with rotation of the rotating electrical machine 80, as described above.

Figure 2:
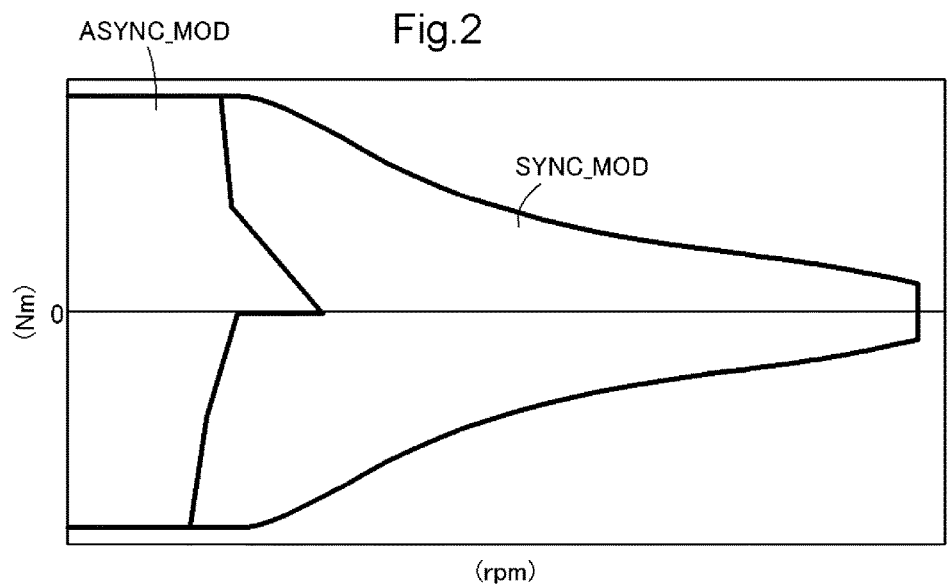
FIG. 2 is a diagram schematically showing the relationship among the rotational speed, torque, and the modulation method.
Figure 3:
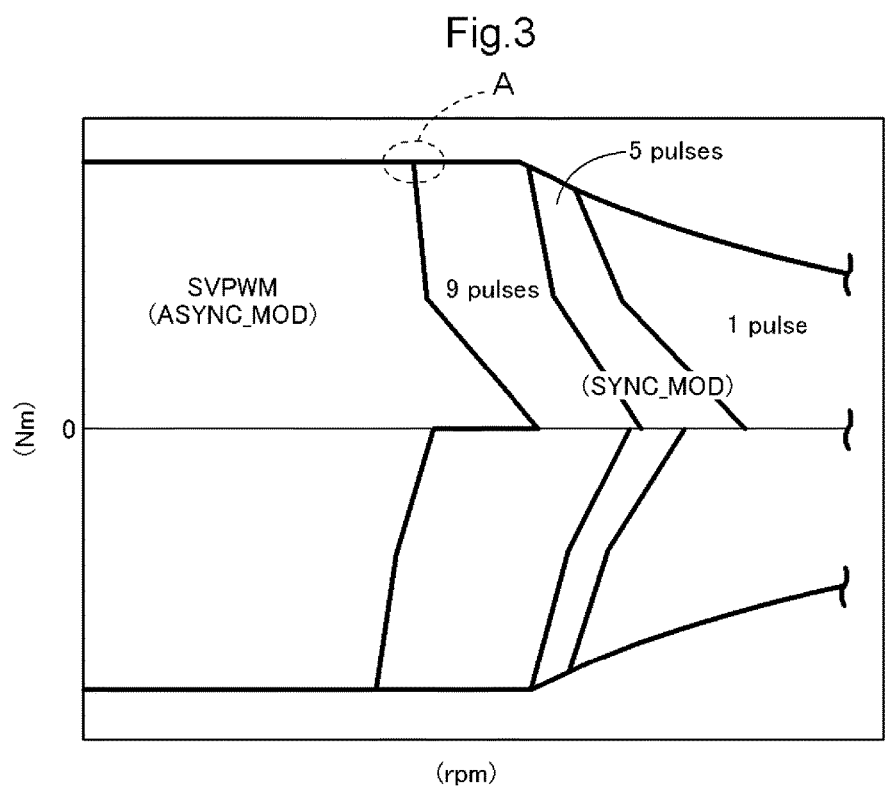
FIG. 3 is a diagram specifically showing an example of the relationship among the rotational speed, torque, and the modulation method.

In the present embodiment, the rotating electrical machine control device 2 switches the modulation method between asynchronous modulation and synchronous modulation according to the operating conditions of the rotating electrical machine 80 to control the rotating electrical machine 80. The operating conditions include at least the rotational speed of the rotating electrical machine 80. If the rotational speed of the rotating electrical machine 80 becomes high, a back electromotive force increases accordingly, and the modulation factor therefore need be increased. Accordingly, if the rotational speed of the rotating electrical machine 80 becomes high, it is preferable to select a modulation method that can perform modulation with a greater modulation factor. It is preferable that the operating conditions for switching the modulation method include the required torque (output torque) of the rotating electrical machine 80, the DC link voltage Vdc, etc., as shown in FIGS. 2 and 3. However, for simplification of description, the present embodiment is described on the assumption that the rotating electrical machine control device 2 switches the modulation method at least according to the rotational speed of the rotating electrical machine 80.

FIG. 2 schematically shows regions where asynchronous modulation (ASYNC_MOD) and synchronous modulation (SYNC_MOD) are used. The ordinate represents the required torque and the abscissa represents the rotational speed. In the present embodiment, asynchronous modulation (such as space vector pulse width modulation) is mainly used in a low rotation, high torque region, and synchronous modulation (such as rectangular wave (single pulse, multi-pulse)) is mainly used in a high rotation, low torque region. The rotating electrical machine control device 2 selectively uses asynchronous modulation or synchronous modulation based at least on the rotational speed of the rotating electrical machine 80 to generate modulation pulses (switching control signals) for controlling the switching elements 3. FIG. 3 specifically shows an example of the relationship among the rotational speed, the torque, and the modulation method in the case where 9-pulse modulation (9 pulses), 5-pulse modulation (5 pulses), and single-pulse modulation (1 pulse) are used as synchronous modulation (SYNC_MOD). The present embodiment will be described with respect to an example in which the modulation method is switched between space vector pulse width modulation (SVPWM) and 9-pulse modulation (9 pulses) when the modulation method is switched between asynchronous modulation (ASYNC_MOD) and synchronous modulation (SYNC_MOD).

Figure 4:
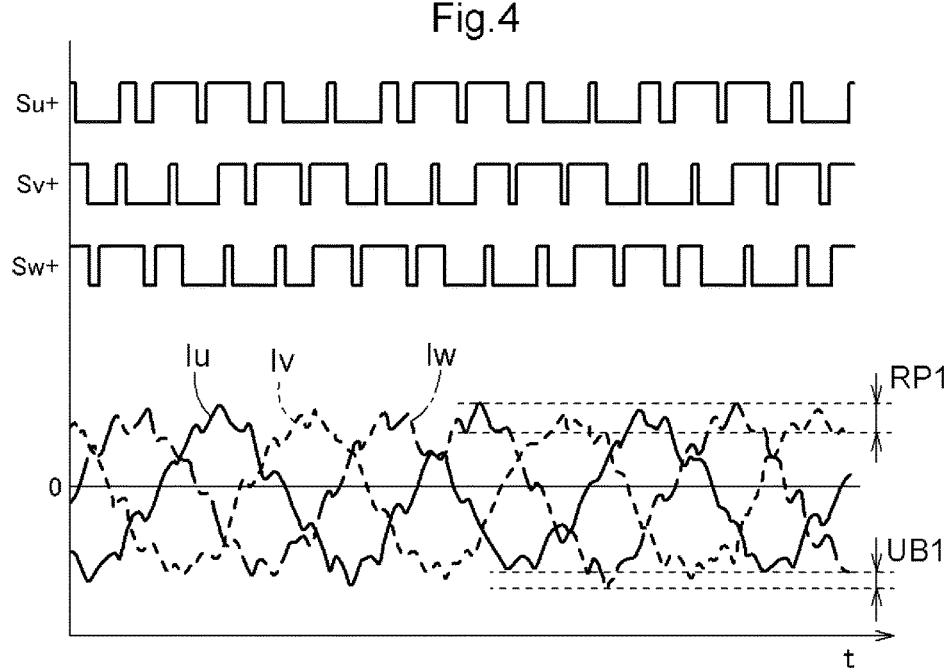
FIG. 4 is a waveform chart showing an example of the relationship between asynchronous modulated pulses and three-phase currents.
Figure 5:
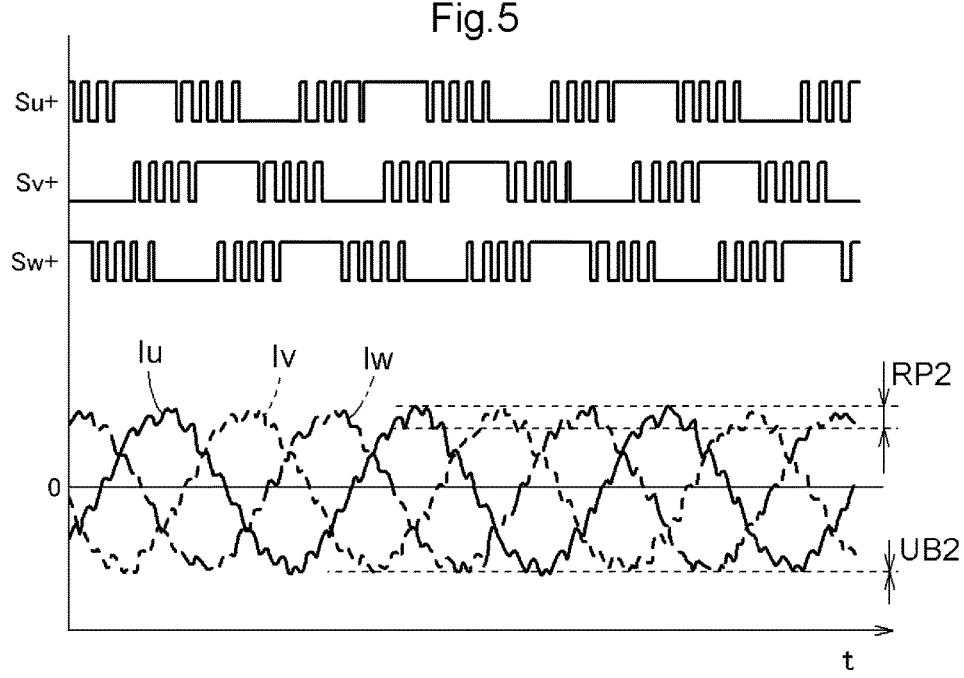
FIG. 5 is a waveform chart showing an example of the relationship between synchronous modulated pulses and three-phase currents.
Figure 6:
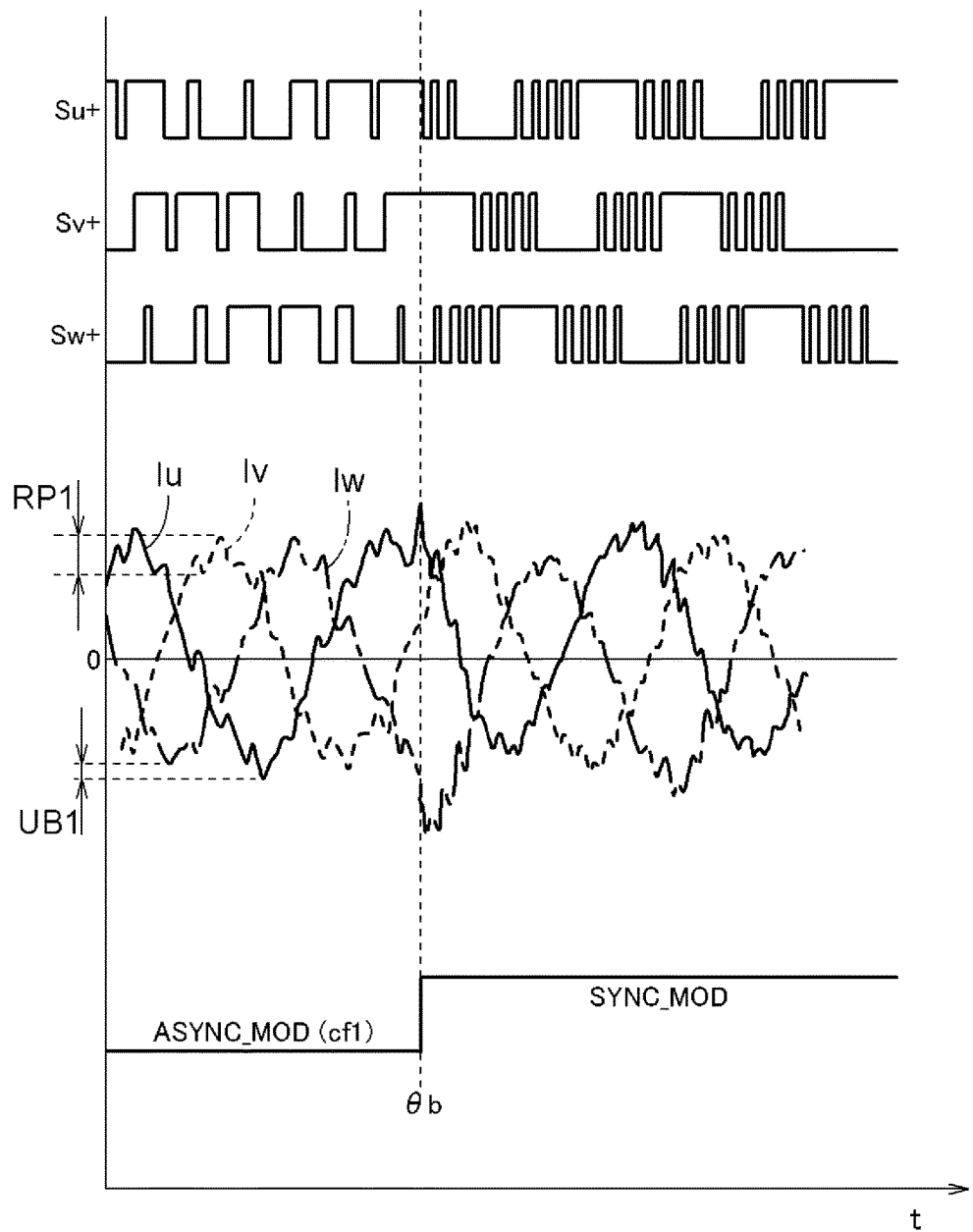
FIG. 6 is a waveform chart showing an example of transition from asynchronous modulation to synchronous modulation.

A region A shown in FIG. 3 will be described. This is the case where the modulation method is switched from asynchronous modulation (space vector pulse width modulation (SVPWM)) to synchronous modulation (9-pulse modulation (9 pulses)) in the state where the required torque is high. FIG. 4 shows simulation results of three-phase alternating current waveforms and pulse waveforms of switching control signals (modulated pulses) in the case where the switching control signals (modulated pulses) are generated by asynchronous modulation (space vector pulse width modulation) in the region A to control switching of the inverter 10. FIG. 5 shows simulation results of three-phase alternating current waveforms and pulse waveforms of switching control signals (modulated pulses) in the case where the switching control signals (modulated pulses) are generated by synchronous modulation (9-pulse modulation) in the region A to control switching of the inverter 10. FIG. 6 shows simulation results of three-phase alternating current waveforms and pulse waveforms of switching control signals (modulated pulses) in the case where the modulation method is switched from asynchronous modulation (space vector pulse width modulation) to synchronous modulation (9-pulse modulation) in the region A. In FIGS. 4 to 6, Su+, Sv+, and Sw+ represent gate drive signals (switching control signals, modulated pulses) for the U-phase, V-phase, and W-phase upper stage switching elements 31 respectively, and Iu, Iv, and Iw represent U-phase, V-phase, and W-phase alternating currents respectively.

FIG. 4 shows waveforms immediately before the modulation method is switched from asynchronous modulation (space vector pulse width modulation) to synchronous modulation (9-pulse modulation), and FIG. 5 shows waveforms immediately after the modulation method is switched from asynchronous modulation (space vector pulse width modulation) to synchronous modulation (9-pulse modulation). In asynchronous modulation, modulated pulses are generated at a carrier frequency of "cf1" (CF=first carrier frequency cf1). The average frequency of the modulated pulses (modulation frequency) is "cf1." In asynchronous modulation at the first carrier frequency cf1, the average frequency of the modulated pulses (modulation frequency) is the same regardless of the rotational speed of the rotating electrical machine 80. Accordingly, the number of modulated pulses per period of the electrical angle decreases as the rotational speed of the rotating electrical machine 80 increases.

In synchronous modulation, the number of modulated pulses per period of the electrical angle is the same regardless of the rotational speed of the rotating electrical machine 80, but the average frequency of the modulated pulses varies according to the rotational speed. In the example (asynchronous modulation) shown in FIG. 4, the number of modulated pulses per period of the electrical angle is about 5 pulses. In the example (synchronous modulation) shown in FIG. 5, the modulation method is 9-pulse modulation and the number of modulated pulses per period of the electrical angle is 9 pulses. In the present embodiment, the modulation frequency at the time the modulation method is switched is higher in synchronous modulation. That is, the modulation frequency of synchronous modulation is higher than the first carrier frequency cf1 because the rotational speed of the rotating electrical machine 80 is higher. In the present embodiment, the first carrier frequency cf1 is about half the frequency of the modulated pulses of synchronous modulation (9-pulse modulation) at this time.

In asynchronous modulation shown in FIG. 4, alternating currents have ripples with larger amplitude than in synchronous modulation shown in FIG. 5 also due to a relatively low modulation frequency (carrier frequency). That is, "ripples RP1 in asynchronous modulation">"ripples RP2 in synchronous modulation," and in the simulation results, "RP1" is about twice "RP2." In asynchronous modulation, three-phase AC current waveforms tend to vary because the number of modulated pulses per period of the electrical angle is smaller than in synchronous modulation and the modulated pulses are not synchronous with the electrical angle (rotation of the rotating electrical machine 80). In other words, the three-phase alternating current waveforms tend to be imbalanced. As shown in FIG. 4, the simulation results show that there is a difference of "UB1" among the peak values of the three-phase alternating currents in the case of asynchronous modulation. In synchronous modulation, the three-phase alternating current waveforms tend to be stable because the number of modulated pulses per period of the electrical angle is larger than in asynchronous modulation and the modulated pulses are synchronous with the electrical angle (rotation of the rotating electrical machine 80). As shown in FIG. 5, the simulation results show that the difference of "UB2" among the peak values of the three-phase alternating currents is almost zero.

FIG. 6 shows simulation results in the case where the modulation method having such characteristics is switched under undesirable conditions. Asynchronous modulation and synchronous modulation are different from each other in how the modulated pulses are generated. Accordingly, the period during which the V-phase gate drive signal "Sv+" is at high level (the period during which the V-phase upper stage switching element 31 is on) at the time the modulation method is switched is long in the present embodiment. The periods during which the U-phase and W-phase gate drive signals are at high level may therefore be short. The three-phase AC voltages and the three-phase alternating currents thus tend to vary. As shown in FIG. 6, the turbulence (imbalance) of the three-phase alternating currents due to asynchronous modulation (ASYNC_MOD) in a high rotational speed region has affected the alternating currents after the modulation method is switched to synchronous modulation (SYNC_MOD).

In the simulation example shown in FIG. 6, the modulation method is switched at a phase (θ=θb) at which the W-phase alternating current has a peak value. The peak current value is therefore significantly large due to a transient current that is generated at the time the modulation method is switched. In other words, since the alternating current has a large initial current value at the time the transient current is to be superimposed thereon, the alternating current with the transient current having superimposed thereon also has a large value. It is not preferable that the peak current value (absolute value) become larger than the maximum permissible current (absolute value) of the inverter 10.

That is, the maximum value (absolute value) of the alternating current at the time the modulation method is switched also varies depending on the phase (current phase or voltage phase) at the time the modulation method is switched. As described above with reference to FIG. 6, when the modulation method is switched at the phase at which a current of one phase out of the multi-phase alternating currents has maximum amplitude, the transient current is superimposed on this maximum current. The maximum value of the absolute value of the alternating current therefore increases accordingly. Accordingly, it is preferable to avoid switching of the modulation method at such a phase and to switch the modulation method at a more preferable phase. In many cases, the inverter 10 is a voltage-controlled inverter, and it is preferable that the timing the modulation method is switched be defined by the voltage phase of the alternating voltage and the voltage phase of the modulated pulses.

Figure 7:
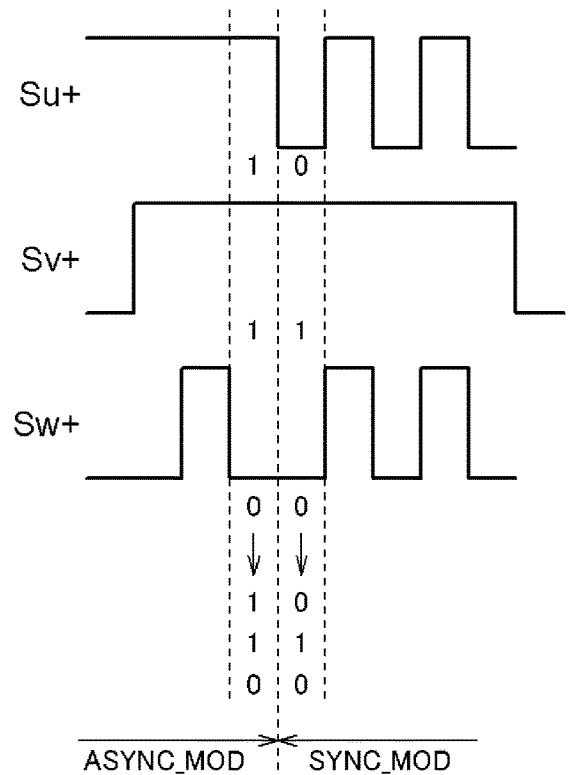
FIG. 7 is an illustration showing an example of voltage phase vectors at the time of transition from asynchronous modulation to synchronous modulation.

For example, when the number of phases on the AC side of the inverter 10 is three, there may be a phase of two-phase modulation in which the voltage level of one phase is fixed and the voltage levels of the remaining two phases change and a phase of single-phase modulation in which the voltage levels of two phases are fixed and the voltage level of the remaining one phase changes. FIG. 7 shows enlarged waveforms of the modulated pulses near a phase at which the modulation method is switched from asynchronous modulation (ASYNC_MOD) to synchronous modulation (SYNC_MOD) in the example shown in FIG. 6. In the example shown in FIG. 6, the modulation method is switched in the phase of single-phase modulation. As described in detail later, the results of experiments and simulations conducted by the inventors show that, in the case of single-phase modulation, the absolute value of the alternating current tends to increase due to the influence of the transient current, as compared to the case of two-phase modulation.

Based on such simulation results as described above, it is preferable to take into consideration the following conditions for switching the modulation method.

(a) Increase the modulation frequency (carrier frequency (CF)) of asynchronous modulation (ASYNC_MOD) to reduce ripples and to reduce the imbalance of three-phase currents.

(b) Switch the modulation method at a phase at which the voltage phase (v) (or current phase (θi)) is optimal to reduce the imbalance of three-phase currents and to reduce the initial current value at the time the modulation method is switched.

Switching of the modulation method which satisfies the conditions (a), (b) can be performed in the following manners (A), (B).

Figure 8:
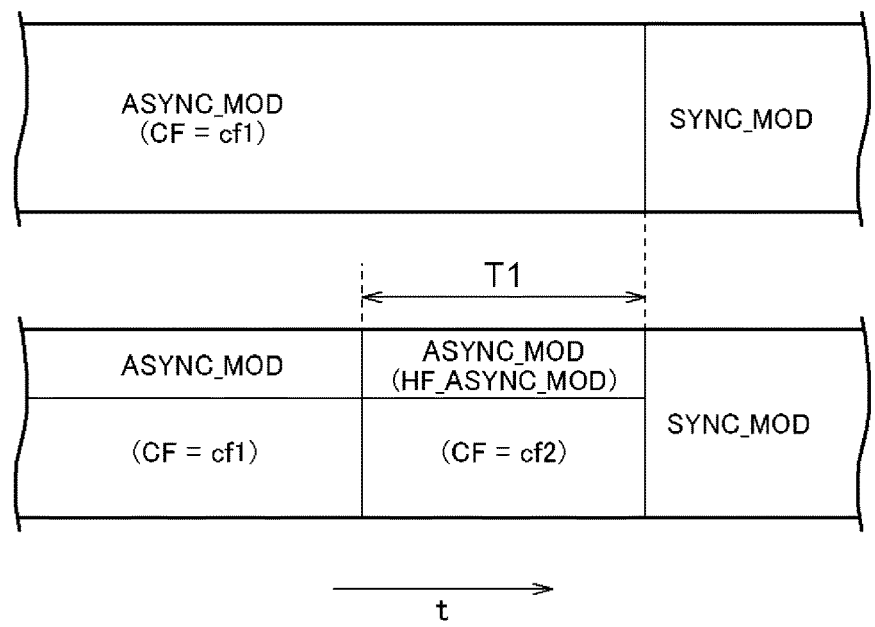
FIG. 8 is an illustration showing an example of transition of the modulation method.

(A) The modulation method is switched through high frequency asynchronous modulation (HF_ASYNC_MOD) in which modulation pulses are generated based on a second carrier frequency cf2 that is a frequency higher than the first carrier frequency cf1 (see FIG. 8). It is preferable that high frequency asynchronous modulation be continued for a period of time it takes for the current waveforms to stabilize (stabilization time (alternating current stabilization time)). However, in the case where the switching elements 3 are switched with modulated pulses at a higher frequency, power consumption of the inverter 10 increases and heat generation thereof also increases. It is therefore preferable that the period during which high frequency asynchronous modulation is performed be limited to within acceptable time during which heat generation associated with an increase in power consumption is acceptable (temperature rise acceptable time). In the present embodiment, high frequency asynchronous modulation is performed for predetermined execution time T1 (high frequency asynchronous modulation execution time). It is preferable to set the execution time T1 to the length equal to or longer than the stabilization time (alternating current stabilization time) and less than the acceptable time (temperature rise acceptable time) (this will be described later reference to FIG. 18).

Figure 9:
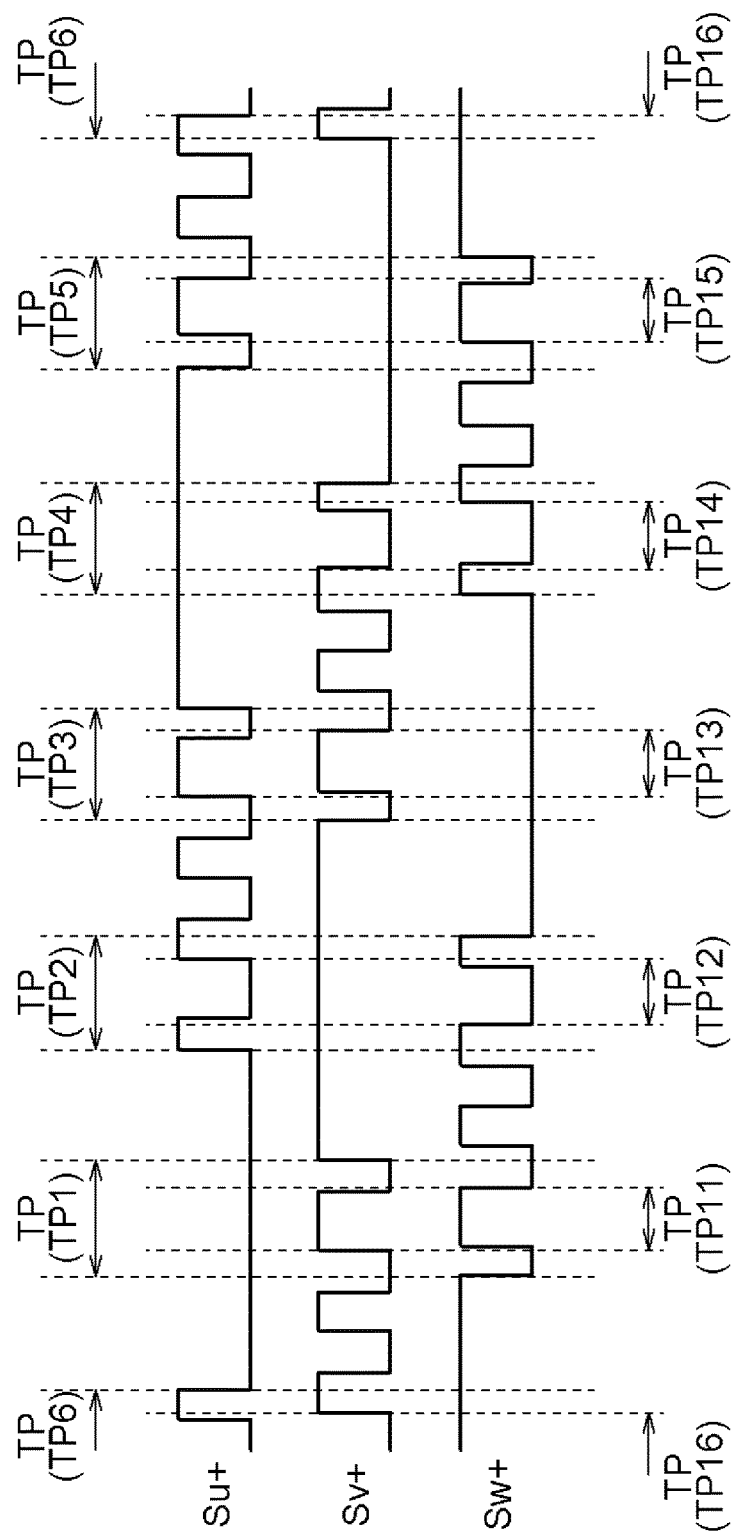
FIG. 9 is a waveform chart showing an example of a preferred voltage phase at which the modulation method is switched.

(B) The modulation method is switched during a transition period TP that are defined based on the voltage phase (θv) showing the relationship among the three-phase AC voltages (see FIG. 9). For example, those periods (TP1 to TP6) of the voltage phase which correspond to two-phase modulation in which the signal level of one phase out of the three-phase AC voltages (equivalent to the three-phase modulated pulses) is fixed to high level or low level and the signal levels of the remaining two phases change while the signal level of the one phase is being fixed are set as the transition periods TP. In the case where the modulation method is to be switched from synchronous modulation to asynchronous modulation, these periods (TP1 to TP6) of the voltage phase are set according to the voltage phase in synchronous modulation. In the case where the modulation method is to be switched from asynchronous modulation to synchronous modulation, it is preferable that these periods (TP1 to TP6) be set according to the voltage phase in synchronous modulation immediately after the modulation method is switched. In other words, in the case where the modulation method is to be switched from asynchronous modulation to synchronous modulation, it is preferable to set the periods (TP1 to TP6) based on the voltage phase on the assumption that the modulation method is synchronous modulation.

The results of simulations conducted by the inventors show that the maximum value (absolute value) of the alternating current is reduced even when only one of (A) and (B) is performed. It is more effective to switch the modulation method by using both (A) and (B).

Figure 10:
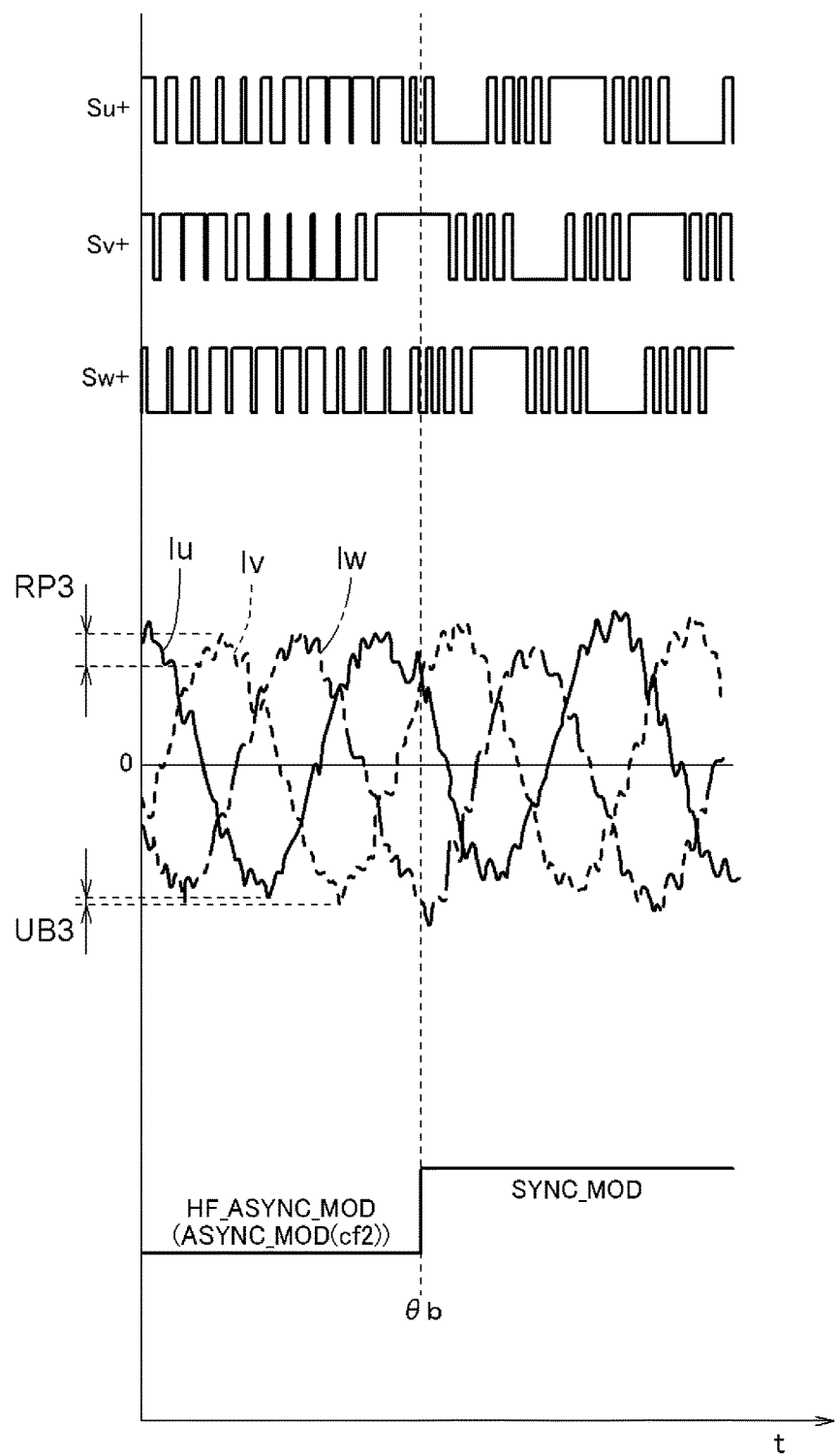
FIG. 10 is a waveform chart showing an example in which the modulation method is switched through high frequency asynchronous modulation.

FIG. 10 shows waveforms in the case where the modulation method is switched between high frequency asynchronous modulation (HF_ASYNC_MOD) and synchronous modulation (SYNC_MOD) by using (A). Comparison between FIGS. 6 and 10 shows that, in FIG. 10, the carrier frequency (CF) of asynchronous modulation (ASYNC_MOD) is higher and the modulated pulses in asynchronous modulation (ASYNC_MOD) are denser than in FIG. 6. Ripples of the alternating currents are thus reduced approximately by half from "RP1" to "RP3." The imbalance of the three-phase alternating currents, specifically the difference among the peak values of the three-phase alternating currents is significantly reduced from "UB1" to "UB3." The voltage phase at the time the modulation method is switched is the same phase "θb" in both FIGS. 6 and 10. However, since the ripples and the imbalance are reduced, the absolute value of the current at the time the modulation method is switched is reduced in FIG. 10. That is, even if a transient current is superimposed on the alternating current at the time the modulation method is switched, the peak value (absolute value) is reduced by using (A).

As described above, in the case where the carrier that is used as a basis to generate the modulated pulses in asynchronous modulation has a low frequency (in the case of the first carrier frequency cf1), resolution of DC-to-AC conversion is lower and pulsations (ripples) of the alternating current are larger than in the case where the carrier has a relatively high frequency (in the case of the second carrier frequency cf2). In asynchronous modulation, the phases of the alternating voltage and the alternating current and the phase of the modulated pulses vary depending on the alternating current period. The alternating current waveforms are therefore unstable and are often imbalanced. Performing high frequency asynchronous modulation, namely asynchronous modulations using a carrier having the second carrier frequency cf2, improves the resolution of DC-to-AC conversion and reduces pulsations, whereby the alternating current waveforms are more stabilized.

The second carrier frequency cf2 has a value larger than the first carrier frequency cf1, and is given by "cf2=cf1×N," where "N" is a value larger than 1. In order to simplify the configuration of the rotating electrical machine control device 2, it is preferable that the second carrier frequency cf2 be an integral multiple of the first carrier frequency cf1. For example, it is preferable that the second carrier frequency cf2 be twice or three times the first carrier frequency cf1. The present embodiment (FIGS. 10 and 13 with respect to FIG. 6) shows an example in which the second carrier frequency cf2 is twice the first carrier frequency cf1. As described above, in the present embodiment, the first carrier frequency cf1 is about half the modulation frequency of synchronous modulation (9-pulse modulation), and the second carrier frequency cf2 is therefore substantially equivalent to the modulation frequency of synchronous modulation.

In one aspect, it is preferable that the second carrier frequency cf2 be set based on the frequency of the modulated pulses of synchronous modulation at the time the modulation method is switched. As described above with reference to FIGS. 2 and 3, asynchronous modulation (ASYNC_MOD) is typically used when the rotational speed of the rotating electrical machine 80 is low, and synchronous modulation (SYNC_MOD) is used when the rotational speed of the rotating electrical machine 80 is high. Accordingly, in many cases, the rotational speed of the rotating electrical machine 80 at the time the modulation method is switched is on the relatively high rotational speed side. In asynchronous modulation using the first carrier frequency cf1, the average frequency of the modulated pulses (modulation frequency) is the same regardless of the rotational speed of the rotating electrical machine 80. On the other hand, in synchronous modulation, the average frequency of the modulated pulses varies according to the rotational speed of the rotating electrical machine 80. For example, in the present embodiment, the modulation frequency at the time of the modulation method is switched is higher in synchronous modulation, and the modulation frequency of synchronous modulation is higher than the first carrier frequency cf1.

In particular, in the case where multi-pulse modulation is performed, the number of pulses (modulation frequency) is often set so as to reduce pulsations of the alternating current and to stabilize amplitude in each phase. It is therefore preferable to set the modulation frequency of high frequency asynchronous modulation based on the modulation frequency of synchronous modulation at the time of the modulation method is switched, so as to reduce pulsations of the alternating current and to stabilize amplitude in each phase. In the present embodiment, the frequency of the modulated pulses of synchronous modulation (9-pulse modulation) is about twice the first carrier frequency cf1. It is therefore preferable to set the second carrier frequency cf2 to a value twice the first carrier frequency cf1, based on this relationship.

In some cases, the DC link voltage Vdc and torque of the rotating electrical machine 80 are also added to the conditions for switching the modulation method, in addition to the rotational speed. In other words, the modulation frequency of synchronous modulation (e.g., 9-pulse modulation) at the time the modulation method is switched may also vary. Accordingly, the second carrier frequency cf2 may be a variable frequency. In one aspect, in the case where the second carrier frequency cf2 is set based on the frequency of the modulated pulses (modulation frequency) of the synchronous modulation at the time the modulation method is switched, the second carrier frequency cf2 may be a variable frequency, and every time the modulation method is switched, the second carrier frequency cf2 may be set according to the modulation frequency of the synchronous modulation at the time of the switching of the modulation method.

However, in the case where the second carrier frequency cf2 is a variable frequency, a computation load on the rotating electrical machine control device 2 may be increased. Accordingly, the second carrier frequency cf2 may be set to a fixed value according to the modulation frequency of the synchronous modulation at the time the modulation method is switched when the operating conditions of the inverter 10 are the worst conditions. Specifically, it is preferable that the second carrier frequency cf2 be set according to the frequency of the modulated pulses of synchronous modulation under the conditions that the maximum rated voltage is applied to the DC-side terminal of the inverter 10, the rotating electrical machine 80 outputs maximum rated torque, and the rotational speed of the rotating electrical machine 80 is the maximum rotational speed of the range in which the rotating electrical machine 80 can output the maximum rated torque. It can be said that these conditions are the worst conditions under which the inverter 10 generates the maximum amount of heat. By setting the second carrier frequency cf2 according to the modulation frequency under these conditions, high frequency asynchronous modulation can be performed while satisfying conditions such as heat resistance.

The modulation method is performed based at least on the rotational speed. In order to prevent hunting, namely frequent switching of the modulation method due to fluctuations in rotational speed, the rotational speed at which the modulation method is switched from asynchronous modulation to synchronous modulation may be different from the rotational speed at which the modulation method is switched from synchronous modulation to asynchronous modulation. In this case, the modulation frequencies of the synchronous modulation corresponding to these rotational speeds are also different from each other. Accordingly, at least two frequencies may be set even when the second carrier frequency cf2 is a fixed frequency.

Figure 11:
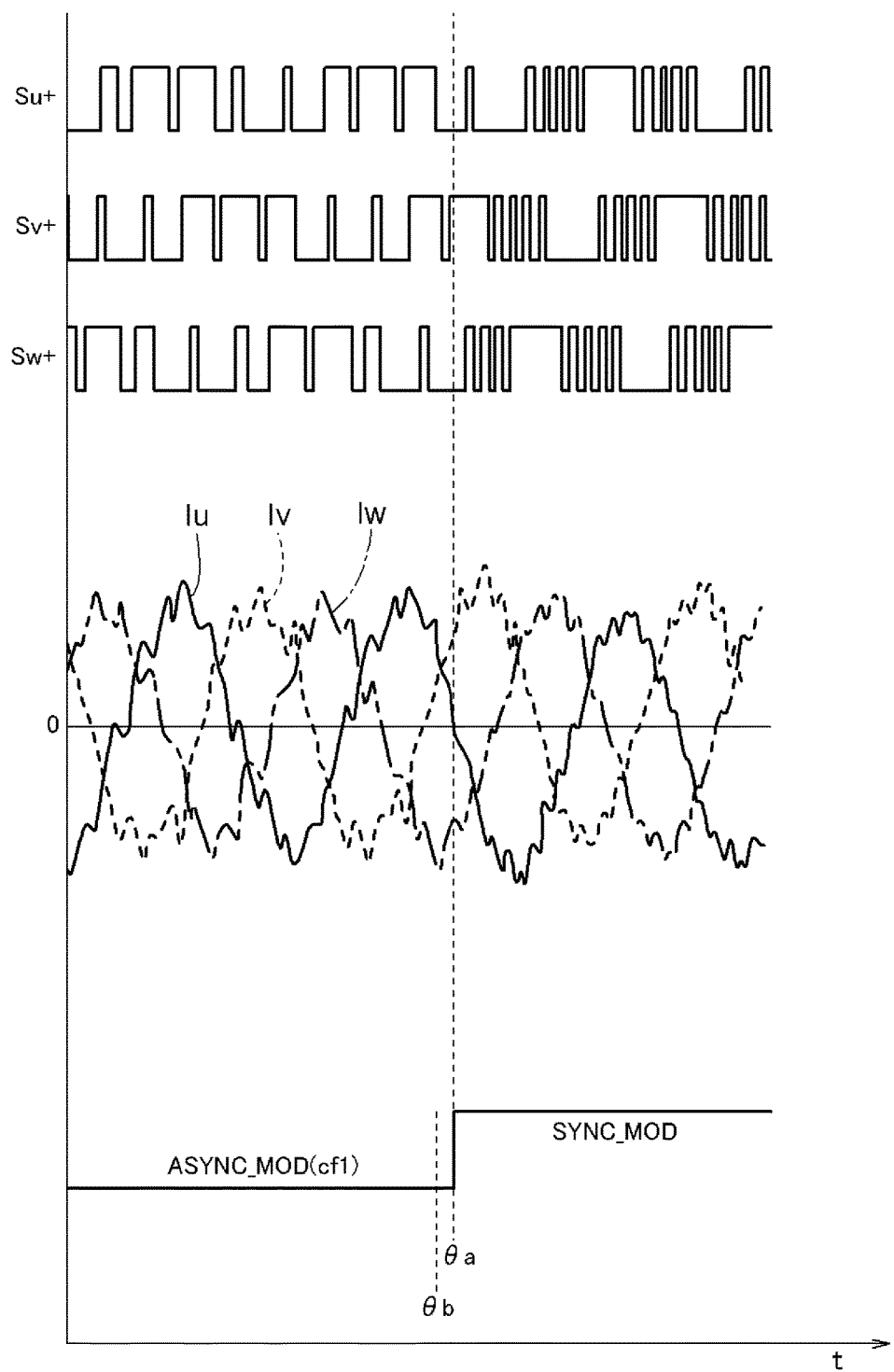
FIG. 11 is a waveform chart showing an example in which the modulation method is switched at a preferred voltage phase.

FIG. 11 shows waveforms in the case where the modulation method is switched in the manner (B). In the example shown in FIG. 6 (and FIG. 10), the modulation method is switched between asynchronous modulation (ASYNC_MOD) and synchronous modulation (SYNC_MOD) when the voltage phase is "θb." In this example, however, the modulation method is switched when the voltage phase is "θa." In FIG. 11, although it is difficult to see because the modulated pulses are switched, the voltage phase "θa" is included in the phase range (transition period TP) corresponding to two-phase modulation in which the signal level of the V-phase voltage (equivalent to the V-phase modulated pulses, the same applies to the following description) is fixed to high level and the signal levels of the U-phase voltage and the W-phase voltage change while the signal level of the V-phase voltage is being fixed. In other words, in the example shown in FIG. 11, the modulation method is switched between asynchronous modulation (ASYNC_MOD) and synchronous modulation (SYNC_MOD) during the transition period (TP) defined based on the voltage phase showing the relationship among the three-phase AC voltages.

Immediately before the voltage phase "θa," there is a state where the V-phase voltage is at low level. This state is a state where all of the three phases, namely U-, V-, and W-phases, are at low level, and is a zero vector state given by "000" as described below. In the case where the number of phases on the AC side of the inverter 10 is three, eight space vectors can be defined by the voltage phase of the three phases (approximately equivalent to the voltage phase of the modulated pulses). Specifically, eight space vectors, which are 100, 010, 001, 110, 101, 011, 111, and 000, can be defined. Of these space vectors, 111 and 000 are called zero vectors, and the remaining six space vectors are called active vectors. The space vectors correlate with the voltage phase. Accordingly, in the following description, the space vectors (states of the space vectors) and the voltage phase may be used as an element indicating the same condition.

As described below with reference to FIG. 12, the results of simulations conducted by the inventors show that, in the case where an active vector period is present before and after switching of the modulation method, the absolute value of the alternating current due to the influence of the transient current tends to be large. On the other hand, in the case where a zero vector period is present before and after switching of the modulation method, the absolute value of the alternating current due to the influence of the transient current tends to be small. Accordingly, it is preferable that periods of the voltage phase, at least either immediately before or immediately after which a period during which the three-phase AC voltages are in the zero vector state is present, be set as the transition periods TP. The voltage phase "θa" is included in such a period of the voltage phase that a period of the zero vector state is present either immediately before or immediately after "θa."

The voltage phase "θa" is also a voltage phase at which the U-phase current is zero. It is thus preferable to switch the modulation method during a period that is included in the transition period TP and that includes a voltage phase (e.g., θa) at which a current of one phase out of the three-phase alternating currents is zero. In other words, it is preferable that voltage phase ranges (TP21 to TP26 in FIG. 12) included in any of those voltage phase ranges (TP1 to TP6) which include the voltage phase (e.g., "θa") at which a current of one phase out of the three-phase alternating currents is zero, and which correspond to two-phase modulation, and those voltage phase ranges (TP11 to TP16) at least either immediately before or immediately after which a period of the zero vector state is present be set as the transition periods TP.

The three-phase alternating currents are balanced, and the instantaneous values of the three-phase currents are theoretically zero. Accordingly, when a current of one of the three phases is zero, currents of the remaining two phases have the same value in the positive and negative directions. Since the three-phase currents have a phase difference of 120 degrees with respect to each other, the currents of the remaining two phases do not have maximum amplitude at the phase at which the current of one of the three phases is zero. Accordingly, even if the transient current is superimposed on the current, the absolute value of the current serving as a base is a relatively small value. It is therefore preferable to switch the modulation method during a period including a voltage phase at which a current of one phase out of the phase alternating currents is zero. As can be seen from comparison between FIGS. 11 and 6, none of the three-phase alternating currents has a peak value at the voltage phase of "θa." Accordingly, the absolute value of the current can be kept small even if the transient current generated when the modulation method is switched is superimposed on the three-phase alternating currents.

Figure 12:
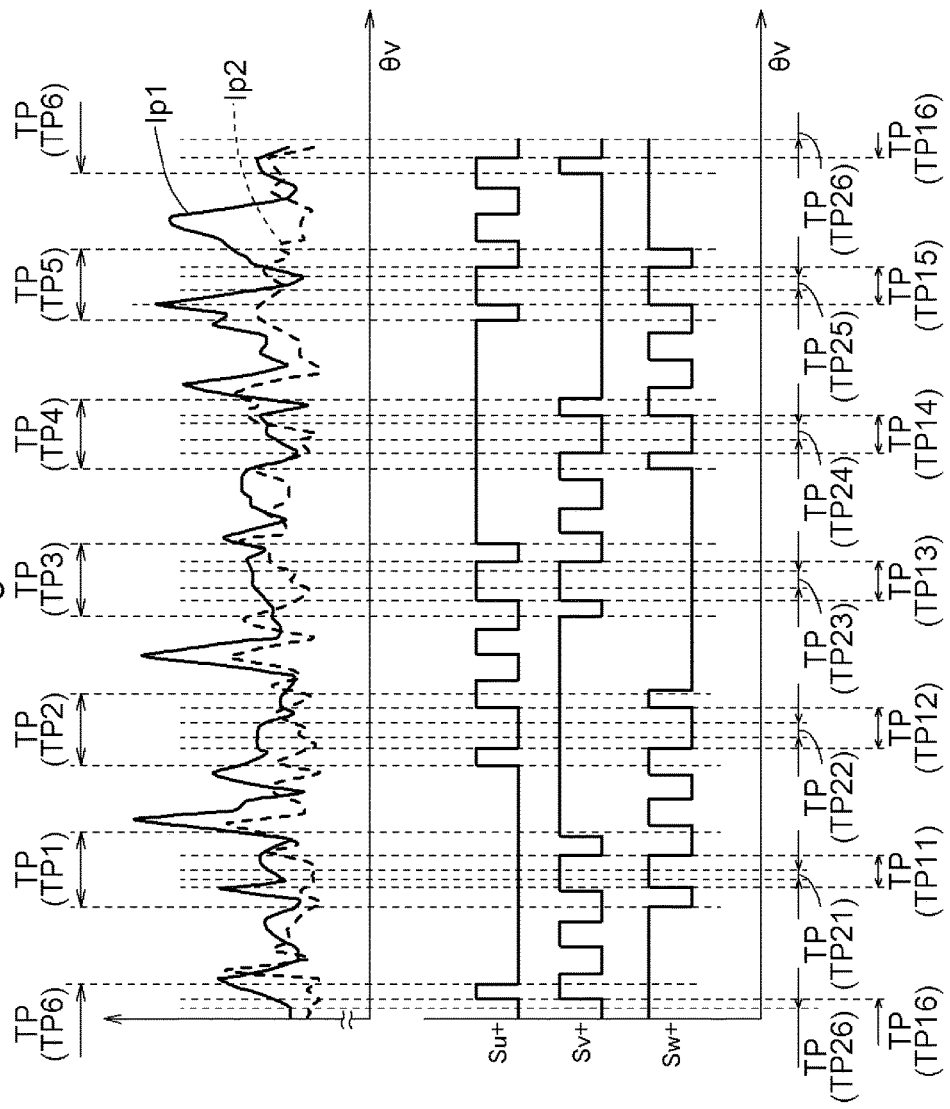
FIG. 12 is a waveform chart showing the relationship between the voltage phase at which the modulation method is switched and the peak values of alternating currents.

FIG. 12 shows simulation results of the relationship between the voltage phase at which the modulation method is switched and the peak values (absolute values) of the three-phase alternating currents. The line graph in the upper stage of FIG. 12 shows the peak values (absolute values) of the three-phase alternating currents computed by performing a sweep simulation such that the voltage phase ($\theta v$) at which the modulation method is switched is shifted by 4 degrees in the electrical angle of 0 to 360 degrees. The solid line graph "Ip1" shows the result of simulations using only (B), and the dashed line graph "Ip2" shows the result of simulations using (A) and (B). Comparison between "Ip1" and "Ip2" will be described later. The lower stage of FIG. 12 shows three-phase voltage waveforms (equivalent to the waveforms of the modulated pulses of the upper stage switching element 31) like FIG. 9.

As shown in FIGS. 9 and 12, TP1 to TP6 as an example of the transition periods TP are the periods of the voltage phase which correspond to two-phase modulation. Referring to "Ip1" of FIG. 12, the periods TP1 to TP6 are set so as not to substantially include the voltage phase at which the absolute value of a peak current is large. The periods "TP1," "TP5" include the voltage phase at which the absolute value of a peak current is large. However, the transition periods TP are preferably further limited periods TP11 to TP16. TP11 to TP16 are even more preferable as the transition periods because TP11 to TP16 are set so as not to substantially include the voltage phase at which the absolute value of a peak current is large. TP11 to TP16 are the periods of the voltage phase at least either immediately before or immediately after which a period during which the three-phase AC voltages (three-phase modulated pulses) are in the zero vector state is present.

It is preferable that the transition periods be further limited voltage phase ranges within TP11 to TP16. As shown in FIG. 12, it is preferable that the transition periods be the voltage phase ranges (TP21 to TP26) that are located in the middle parts of TP11 to TP16 and that are ½ to ⅓ of the ranges TP11 to TP16. TP21 to TP26 are the voltage phase ranges including at least a voltage phase (e.g., "$\theta a$") at which a current of one phase out of the three-phase alternating currents is zero. As can be seen from FIG. 12, the absolute values of the peak currents in these voltage phase ranges (TP21 to TP26) are generally smaller than the absolute values of the peak currents at the other voltage phases.

As can be seen from FIG. 12, in order to switch the modulation method at a more appropriate timing, it is preferable that the transition periods be limited to an appropriate width (phase width). It is preferable that this phase width be set based on the relationship between the control period of the rotating electrical machine control device 2 and the electrical angle of the rotating electrical machine 80. In order to smoothly rotate the rotating electrical machine 80, it is preferable that 5 to 9 modulated pulses be present in one period of the electrical angle, except for single-pulse modulation during high speed rotation, etc. Referring to FIGS. 9, 12, etc., there are also periods during which the modulated pulses have a long pulse width. Accordingly, the pulse width (phase width) can be computed on the assumption that there are approximately 5 to 9 pulses in each half period of the electrical angle. If it is assumed that there are 9 pulses in 180 degrees, the pulse width (phase width) is 20 degrees. This phase width approximately corresponds to the transition periods shown by TP11 to TP16. Each of the transition periods TP shown by TP21 to Tp26 is about ⅓ to ½ of the transition period TP11 to TP16, the phase width is approximately 6 to 10 degrees.

As described above, the pulse width (phase width) of the modulated pulses also varies according to the carrier frequency. The pulse width (phase width) of the modulated pulses also varies according to the control period of the rotating electrical machine control device 2. The present embodiment shows an example in which the second carrier frequency cf2 is twice the first carrier frequency cf1. It is therefore preferable that the above phase width of the transition periods TP is also set to a value that is twice the above value in order to provide some allowance. In the above example, the phase width of the transition periods TP shown by TP21 to Tp26 is 6 to 10 degrees. However, it is preferable that this phase width be set to a value within the range of about 6 to 20 degrees.

"Ip2" in FIG. 12 shows the simulation results in the case where the modulation method is switched by using both (A) and (B). As can be seen from comparison between "Ip1" and "Ip2," the absolute values of the peak currents are smaller in "Ip2." Accordingly, the absolute values of the peak values of the three-phase AC currents at the time the modulation method is switched can further be reduced by using both (A) and (B).

Figure 13:
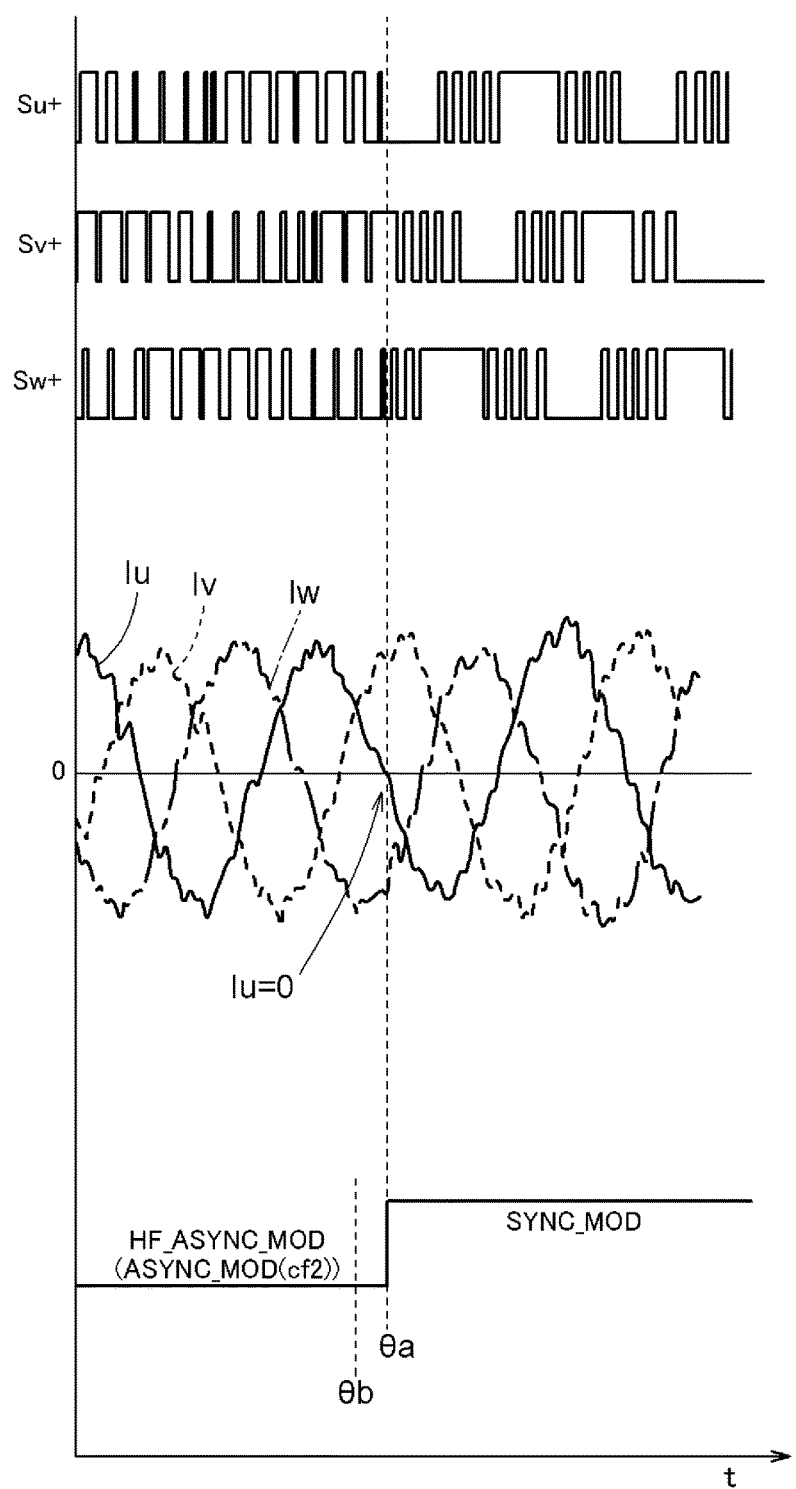
FIG. 13 is a waveform chart showing an example in which the modulation method is switched at a preferred voltage phase through high frequency asynchronous modulation.

FIG. 13 shows waveforms in the case where the modulation method is switched between high frequency asynchronous modulation (HF_ASYNC_MOD) and synchronous modulation (SYNC_MOD) by using both (A) and (B). As can be seen from comparison between FIGS. 13 and 6, comparison between FIGS. 13 and 10, and comparison between FIGS. 13 and 11 and from the overview of the comparison results, the use of both (A) and (B) can reduce the absolute values of the peak values of the three-phase alternating currents at the time the modulation method is switched and can reduce the imbalance of the three-phase alternating currents.

Figure 14:
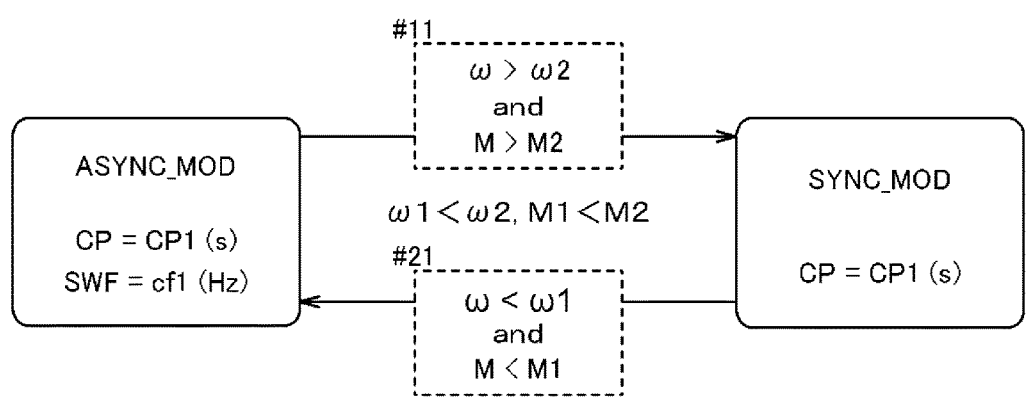
FIG. 14 is a state transition diagram showing a typical example in which the modulation method is switched.
Figure 15:
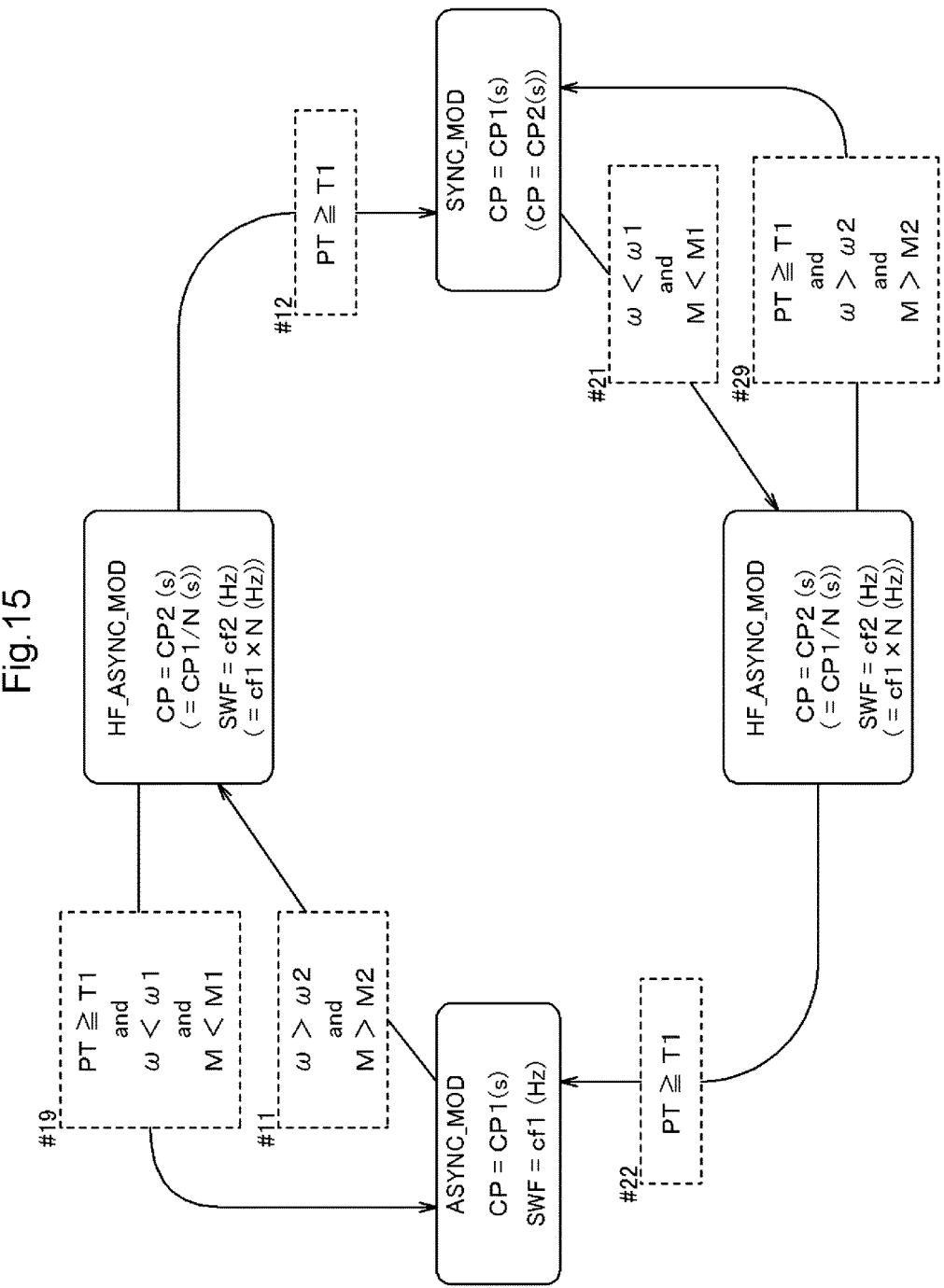
FIG. 15 is a state transition diagram showing an example in which the modulation method is switched through high frequency asynchronous modulation.
Figure 16:
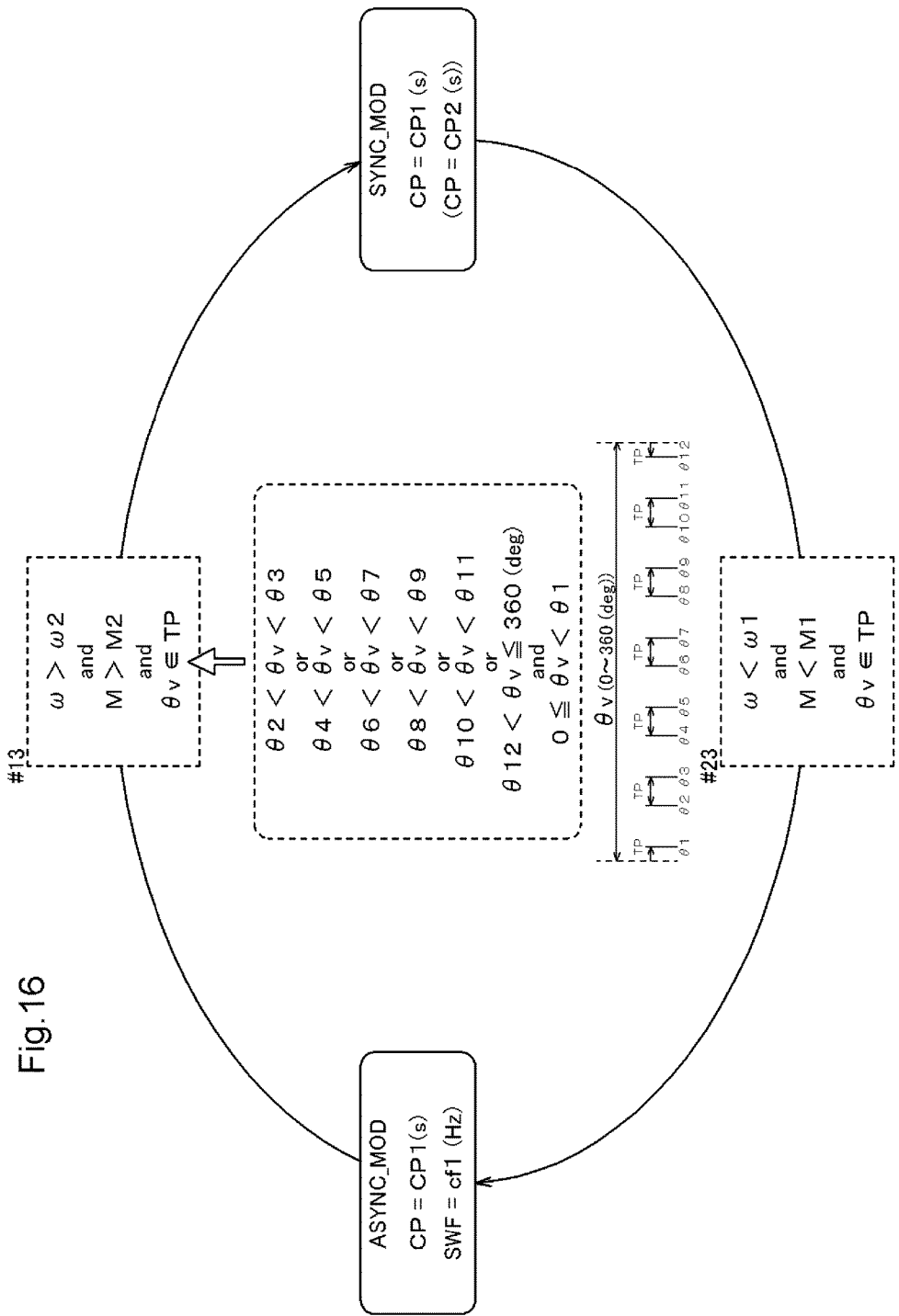
FIG. 16 is a state transition diagram showing an example in which the modulation method is switched at a preferred voltage phase.
Figure 17:
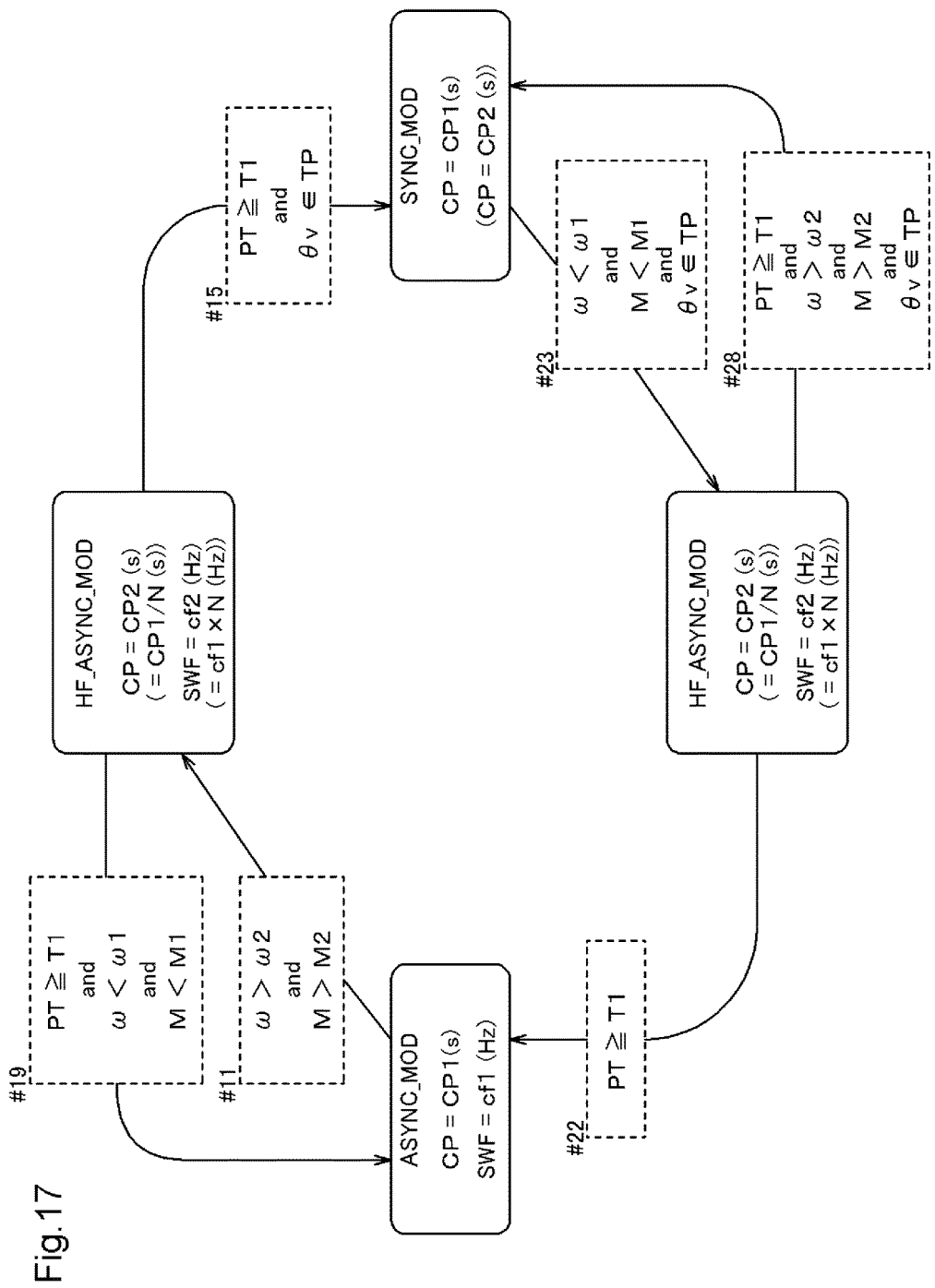
FIG. 17 is a state transition diagram showing an example in which the modulation method is switched at a preferred voltage phase through high frequency asynchronous modulation.

The principle at the time of switching the modulation method is described above. A control method that is performed by the rotating electrical machine control device 2 will be specifically described with reference to the state transition diagrams of FIGS. 14 to 17. FIG. 14 shows a state transition in the case where the modulation method is switched without using (A) and (B), and corresponds to the example shown in FIG. 6. FIG. 15 shows a state transition in the case where the modulation method is switched by using (A), and corresponds to the example shown in FIGS. 8 and 10. FIG. 16 shows a state transition in the case where the modulation method is switched by using (B), and corresponds to the example shown in FIGS. 9, 11, and 12 ("Ip1"). FIG. 17 shows a state transition in the case where the modulation method is switched by using both (A) and (B), and corresponds to the example shown in FIGS. 12 ("Ip2") and 13. In each state transition diagram, the switching frequency (SWF) corresponds to the average frequency of the modulated pulses (modulation frequency).

As shown in FIG. 14, the rotating electrical machine control device 2 transitions the modulation method based on the rotational speed ($\omega$) and the modulation factor (M) in the case where the rotating electrical machine control device 2 switches the modulation method between asynchronous modulation (ASYNC_MOD) and synchronous modulation (SYNC_MOD) without performing (A) and (B). In the case where the rotating electrical machine control device 2 is generating the modulated pulses by asynchronous modulation (ASYNC_MOD), the rotating electrical machine control device 2 transitions the modulation method to synchronous modulation (SYNC_MOD) when the rotational speed ($\omega$) is higher than "$\omega 2$" and the modulation factor (M) is greater than "M2" (#11). On the other hand, in the case where the rotating electrical machine control device 2 is generating the modulated pulses by synchronous modulation (SYNC_MOD), the rotating electrical machine control device 2 transitions the modulation method to asynchronous modulation (ASYNC_MOD) when the rotational speed (a)) is less than "$\omega 1$" and the modulation factor (M) is less than "M1" (#21). The threshold value of the rotational speed is "$\omega 1 < \omega 2$" and the threshold value of the modulation factor is "M1<M2." Providing hysteresis in this manner prevents hunting of the modulation method even if the rotational speed or the modulation factor fluctuates near its threshold value.

In this example, a control period (CP) in asynchronous modulation (ASYNC_MOD) and a control period (CP) in synchronous modulation are the same period "CP1." The modulation frequency (carrier frequency) in asynchronous modulation is the first carrier frequency cf1, which corresponds to the switching frequency (SWF). The first carrier frequency cf1 is ½ of the reciprocal of the control period "CP1." That is, the modulated pulses are generated so that the signal level changes once in a single control period.

As shown in FIG. 15, the rotating electrical machine control device 2 also transitions the modulation method based on the rotational speed ($\omega$) and the modulation factor (M) in the case where the rotating electrical machine control device 2 switches the modulation method by using (A). In this example, however, the rotating electrical machine control device 2 switches the modulation method through high frequency asynchronous modulation (HF_ASYNC_MOD). High frequency asynchronous modulation is performed for predetermined execution time T1. In the present embodiment, the second carrier frequency cf2, which is a switching frequency (SWF) corresponding to the modulation frequency (carrier frequency) in high frequency asynchronous modulation, is N times the first carrier frequency cf1. The control period (CP) in the case of performing high frequency asynchronous modulation is therefore reduced. Namely, this control period (CP) is "CP2" that is 1/N of the period "CP1."

In the case where the rotating electrical machine control device 2 is generating the modulated pulses by asynchronous modulation (ASYNC_MOD), the rotating electrical machine control device 2 first transitions the modulation method to high frequency asynchronous modulation (HF_ASYNC_MOD) when the rotational speed ($\omega$) is higher than "$\omega 2$" and the modulation factor (M) is greater than "M2" (#11). The rotating electrical machine control device 2 transitions the modulation method to synchronous modulation (SYNC_MOD) if time (PT) that has passed since the transition to high frequency asynchronous modulation (HF_ASYNC_MOD) becomes equal to or longer than the predetermined execution time T1 (#12). The control period (CP) in synchronous modulation may be "CP2" that is the same as in high frequency asynchronous modulation, or may be "CP1" that is the same as in asynchronous modulation. In the case where the rotating electrical machine control device 2 is generating the modulated pulses by synchronous modulation (SYNC_MOD), the rotating electrical machine control device 2 first transitions the modulation method to high frequency asynchronous modulation (HF_ASYNC_MOD) when the rotational speed (w) is less than "$\omega 1$" and the modulation factor (M) is less than "M1" (#21). The rotating electrical machine control device 2 transitions the modulation method to asynchronous modulation (ASYNC_MOD) if the time (PT) that has passed since the transition to high frequency asynchronous modulation becomes equal to or longer than the predetermined execution time T1 (#22).

In the case where the rotating electrical machine control device 2 has transitioned the modulation method from asynchronous modulation (ASYNC_MOD) to high frequency asynchronous modulation (HF_ASYNC_MOD) and is generating the modulated pulses by high frequency asynchronous modulation (HF_ASYNC_MOD), the rotating electrical machine control device 2 transitions the modulation method back to asynchronous modulation (ASYNC_MOD) when the rotational speed ($\omega$) is less than "$\omega 1$," the modulation factor (M) is less than "M1," and the time (PT) that has passed since the transition from asynchronous modulation (ASYNC_MOD) to high frequency asynchronous modulation (HF_ASYNC_MOD) becomes equal to or longer than the execution time T1 (#19). In the case where the rotating electrical machine control device 2 has transitioned the modulation method from synchronous modulation (SYNC_MOD) to high frequency asynchronous modulation (HF_ASYNC_MOD) and is generating the modulated pulses by high frequency asynchronous modulation (HF_ASYNC_MOD), the rotating electrical machine control device 2 transitions the modulation method back to synchronous modulation (HSYNC_MOD) when the rotational speed ($\omega$) is higher than "$\omega 2$," the modulation factor (M) is greater than "M2," and the time (PT) that has passed since the transition from synchronous modulation (SYNC_MOD) to high frequency asynchronous modulation (HF_ASYNC_MOD) becomes equal to or longer than the execution time T1 (#29).

As shown in FIG. 16, the rotating electrical machine control device 2 also transitions the modulation method based on the rotational speed ($\omega$) and the modulation factor (M) in the case where the rotating electrical machine control device 2 switches the modulation method by using (B). In this example, however, the rotating electrical machine control device 2 switches the modulation method when the voltage phase ($\theta$v) is within the range of the transition period TP. In the case where the rotating electrical machine control device 2 is generating the modulated pulses by asynchronous modulation (ASYNC_MOD), the rotating electrical machine control device 2 transitions the modulation method to synchronous modulation (SYNC_MOD) when the rotational speed ($\omega$) is higher than "$\omega 2$," the modulation factor (M) is greater than "M2," and the voltage phase ($\theta$v) at that time is included in the transition period TP (#13). In the case where the rotating electrical machine control device 2 is generating the modulated pulses by synchronous modulation (SYNC_MOD), the rotating electrical machine control device 2 transitions the modulation method to asynchronous modulation (ASYNC_MOD) when the rotational speed ($\omega$) is less than "$\omega$)," the modulation factor (M) is less than "M1," and the voltage phase ($\theta$v) at that time is included in the transition period TP (#23).

As shown in FIG. 16 (and FIGS. 9 and 12), six transition periods TP are present in a single period of the electrical angle. As shown in FIG. 16, the modulation method is switched in the case where the voltage phase ($\theta$v) is larger than $\theta 2$ and smaller than $\theta 3$, is larger than $\theta 4$ and smaller than $\theta 5$, is larger than $\theta 6$ and smaller than $\theta 7$, is larger than $\theta 8$ and smaller than $\theta 9$, is larger than $\theta 10$ and smaller than $\theta 11$, or is larger than $\theta 12$ and smaller than 360 degrees and is equal to or larger than 0 degrees and smaller than $\theta 1$. The transition periods TP are defined by "larger than $\theta$n and smaller than $\theta$m," where n is an even number and m is an odd number. However, the conditions for boundaries of the transition periods TP may be "equal to or larger than, and equal to or smaller than." That is, the transition periods TP may be defined as being "equal to or larger than θn and equal to or smaller than θm," "larger than θn and equal to or smaller than θm," or "equal to or larger than θn and smaller than θm." θ1 to θ12 may be the voltage phases that define TP1 to TP6 shown in FIGS. 9 and 12, or the voltage phases that define TP11 to TP16. θ1 to θ12 may be the voltage phases that define TP21 to TP26 shown in FIG. 12.

As shown in FIG. 17, by combining the conditions shown in FIGS. 15 and 16, the modulation method can be switched by using (A) and (B). In the case where the rotating electrical machine control device 2 is generating the modulated pulses by asynchronous modulation (ASYNC_MOD), the rotating electrical machine control device 2 first transitions the modulation method to high frequency asynchronous modulation (HF_ASYNC_MOD) when the rotational speed (ω) is higher than "ω2" and the modulation factor (M) is greater than "M2" (#11). The rotating electrical machine control device 2 transitions the modulation method to synchronous modulation (SYNC_MOD) when the time (PT) that has passed since the transition to high frequency asynchronous modulation (HF_ASYNC_MOD) becomes equal to or longer than the execution time T1 and the voltage phase (θv) at that time is included in the transition period TP (#15). In the case where the rotating electrical machine control device 2 is generating the modulated pulses by synchronous modulation (SYNC_MOD), the rotating electrical machine control device 2 first transitions the modulation method to high frequency asynchronous modulation (HF_ASYNC_MOD) when the rotational speed (ω) is less than "ω1," the modulation factor (M) is less than "M1," and the voltage phase (θv) at that time is included in the transition period TP (#23). The rotating electrical machine control device 2 transitions the modulation method to asynchronous modulation (ASYNC_MOD) when the time (PT) that has passed since the transition to high frequency asynchronous modulation (HF_ASYNC_MOD) becomes equal to or longer than the predetermined execution time T1 (#22).

In the case where the rotating electrical machine control device 2 has transitioned the modulation method from asynchronous modulation (ASYNC_MOD) to high frequency asynchronous modulation (HF_ASYNC_MOD) and is generating the modulated pulses by high frequency asynchronous modulation (HF_ASYNC_MOD), the rotating electrical machine control device 2 transitions the modulation method back to asynchronous modulation (ASYNC_MOD) when the rotational speed (ω) is less than "ω1," the modulation factor (M) is less than "M1," and the time (PT) that has passed since the transition from asynchronous modulation (ASYNC_MOD) to high frequency asynchronous modulation (HF_ASYNC_MOD) becomes equal to or longer than the execution time T1 (#19). In the case where the rotating electrical machine control device 2 has transitioned the modulation method from synchronous modulation (SYNC_MOD) to high frequency asynchronous modulation (HF_ASYNC_MOD) and is generating the modulated pulses by high frequency asynchronous modulation (HF_ASYNC_MOD), the rotating electrical machine control device 2 transitions the modulation method back to synchronous modulation (SYNC_MOD) when the rotational speed (ω) is higher than "ω2," the modulation factor (M) is greater than "M2," the time (PT) that has passed since the transition from synchronous modulation (SYNC_MOD) to high frequency asynchronous modulation (HF_ASYNC_MOD) becomes equal to or longer than the execution time T1, and the voltage phase (θv) at that time is included in the transition period TP (#28).

Conditions for setting the predetermined execution time T1 of high frequency asynchronous modulation (high frequency asynchronous modulation execution time) will be described. As described above, it is preferable to set the execution time T1 to the length equal to or longer than the stabilization time (alternating current stabilization time) and less than the acceptable time (temperature rise acceptable time). The stabilization time and the acceptable time may be set as fixed values based on the specifications and operating conditions (environmental conditions) of the rotating electrical machine drive device 1, the rotating electrical machine control device 2, the rotating electrical machine 80, etc. Alternatively, the stabilization time and the acceptable time may be set as floating values so that, every time high frequency asynchronous modulation is performed, the stabilization time and the acceptable time are determined based on conditions (specifications and operating conditions) at that time.

Figure 18:
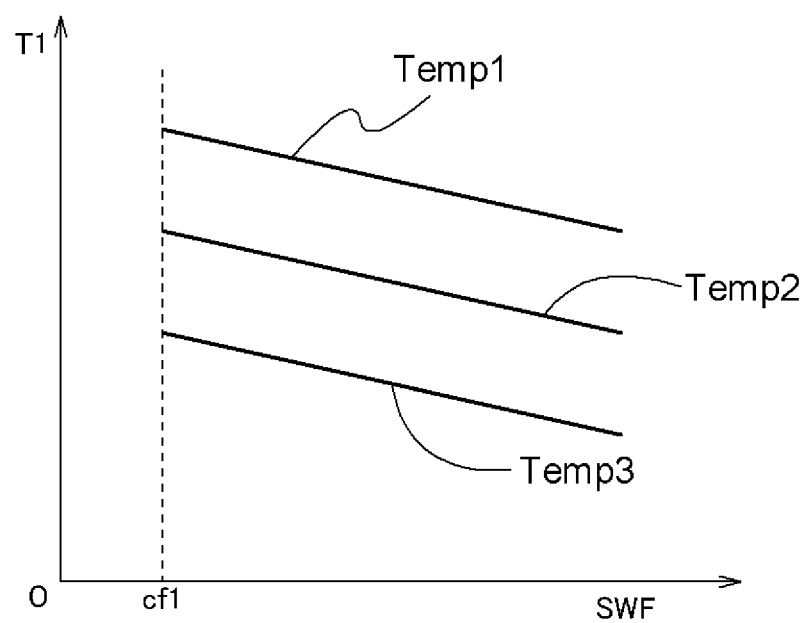
FIG. 18 is a diagram showing an example of the relationship between the modulation frequency and the execution time of high frequency asynchronous control.

As described above, as the modulation frequency (carrier frequency) increases, the switching elements 3 are switched with modulated pulses of a higher frequency. Power consumption of the inverter 10 therefore increases and heat generation thereof also increases. Accordingly, it is preferable to limit the execution time of high frequency asynchronous modulation to within the acceptable time (temperature rise acceptable time) during which heat generation associated with an increase in power consumption is acceptable. This acceptable time is the maximum value of the execution time T1 (high frequency asynchronous modulation execution time). For example, as shown in FIG. 18, the higher modulation frequency (switching frequency (SWF)) is, the shorter the acceptable time is. An acceptable temperature rise varies depending on the temperature (initial temperature) of the switching elements 3 (inverter 10) at the time high frequency asynchronous modification is started. That is, in the case where the initial temperature is low, the acceptable temperature rise is larger than in the case where the initial temperature is high. It is therefore preferable to define the allowable time based on a plurality of frequency characteristics that are different according to the initial temperature, as shown in FIG. 18. FIG. 18 shows frequency characteristics corresponding to the initial temperatures of Temp1, Temp2, Temp3. For the initial temperatures, Temp1 is the lowest, and Temp3 is the highest. That is, the higher the initial temperature of the switching elements 3 (inverter 10) at the time high frequency asynchronous modulation is started is, the shorter the allowable time is. Moreover, the higher the modulation frequency (second carrier frequency) at the time high frequency asynchronous modulation is performed is, the shorter the allowable time is.

As described above, it is preferable that high frequency asynchronous modulation be continued for a period of time it takes for the current waveforms to stabilize (stabilization time (alternating current stabilization time)). The stabilization time is the minimum value of the execution time T1 (high frequency asynchronous modulation execution time). The stabilization time is the time defined mainly according to the specifications of the rotating electrical machine 80 and is the minimum time that can ensure stability of the rotating electrical machine 80. This time is determined by the specifications (electromagnetic parameters) of the rotating electrical machine 80. Regarding the relationship with the control periods (CP), it is preferable that the time corresponding to the number of control periods (at least one to two periods) by which the imbalance of the electric currents due to the imbalance of the three-phase AC voltages is eliminated be defined as the stabilization time.

[Other Embodiments]

Other embodiments will be described below. The configuration of each embodiment described below may not only be used by itself, but also be combined with any of the configurations of the other embodiments unless inconsistency arises.

(1) In the above description, a form in which the modulation method is switched between space vector pulse width modulation and 9-pulse modulation is shown as a form in which the modulation method is switched between asynchronous modulation and synchronous modulation. However, it is also described above that asynchronous modulation includes a form other than space vector pulse width modulation and synchronous modulation includes a form other than 9-pulse modulation. Accordingly, the form in which the modulation method is switched between asynchronous modulation and synchronous modulation is not limited to the form described above.

(2) The above description shows the case where the first carrier frequency cf1 is about ½ of the modulation frequency of synchronous modulation at the time the modulation method is switched (see FIGS. 10 and 13 with respect to FIG. 6).

The above description also shows the case where the second carrier frequency cf2 is twice the first carrier frequency cf1. The second carrier frequency cf2 may be either higher or lower than the modulation frequency of synchronous modulation at the time the modulation method is switched. In the case where the second carrier frequency cf2 is higher than the modulation frequency of synchronous modulation at the time the modulation method is switched, heat generation of the inverter 10 may increase due to an increase in power consumption of the inverter 10. Accordingly, the allowable time is reduced, and the maximum value of the execution time T1 that can be set is also reduced. The second carrier frequency cf2 can be set to a frequency higher than the modulation frequency of synchronous modulation at the time the modulation method is switched, as long as the second carrier frequency cf2 is within such a range that ensures sufficient time for the alternating current waveforms to stabilize.

On the other hand, the modulation frequency of synchronous modulation is set in view of the temperature rise of the inverter 10. Accordingly, the allowable time need not be considered in the case where the second carrier frequency cf2 is lower than the modulation frequency of synchronous modulation at the time the modulation method is switched. However, if the modulation frequency is low, it tends to take longer for the alternating current waveforms to stabilize. Accordingly, in the case where the second carrier frequency cf2 is set to a frequency lower than the modulation frequency of synchronous modulation at the time the modulation method is switched, it is preferable that the second carrier frequency cf2 be set to a value in such a range that does not reduce response to control of the rotating electrical machine 80.

(3) According to the above description, it is preferable that, in the case where the modulation method is switched from asynchronous modulation to synchronous modulation, it is preferable to set the transition periods TP based on the voltage phase in synchronous modulation immediately after the modulation method is switched (the voltage phase on the assumption that the modulation method is synchronous modulation). This form is more preferable, but the present disclosure does not preclude setting of the transition periods TP based on the voltage phase of the pulses of asynchronous modulation in the case where the modulation method is switched from asynchronous modulation to synchronous modulation.

[Summary of Embodiment]

Brief summary of the rotating electrical machine control device (2) described above will be provided below.

In one aspect, a rotating electrical machine control device (2) that controls an alternating current rotating electrical machine (80) via an inverter (10) that carries out conversion between DC power and multi-phase AC power switches a modulation method between asynchronous modulation in which switching of the inverter (10) is controlled by modulated pulses generated based on a carrier having a first carrier frequency (cf1) which is not synchronous with rotation of the rotating electrical machine (80) and synchronous modulation in which switching of the inverter (10) is controlled by modulated pulses generated in synchronization with rotation of the rotating electrical machine (80), the switching of the modulation method between the asynchronous modulation and the synchronous modulation being performed according to an operating condition of the rotating electrical machine (80) which includes at least a rotational speed of the rotating electrical machine (80). In a case where the rotating electrical machine control device (2) switches the modulation method between the asynchronous modulation and the synchronous modulation, the rotating electrical machine control device (2) switches the modulation method through high frequency asynchronous modulation in which modulated pulses are generated based on a second carrier frequency (cf2) that is a frequency higher than the first carrier frequency (cf1).

In the case where the carrier that is used as a basis to generate the modulated pulses in the asynchronous modulation has a relatively low frequency, resolution of DC-to-AC conversion is relatively low. Accordingly, pulsations (ripples) of an alternating current are larger than in the case where the carrier has a relatively high frequency. If a transition current resulting from switching of the modulation method is superimposed at a phase at which the absolute value of the alternating current is large due to the pulsation components, the absolute value of the alternating current may further increase accordingly. In the asynchronous modulation, the phases of an alternating voltage and an alternating current and the phase of modulated pulses vary depending on the alternating current period. Waveforms of the alternating voltage and the alternating voltage are therefore unstable. In other words, the maximum amplitude of the alternating current may be different among the plurality of phases, or even in the same phase, may vary depending on the period. If a transient current is superimposed on the alternating current near a peak of the waveform in a period during which the maximum amplitude of the alternating current is large, the absolute value of the alternating current increases accordingly. In the above configuration, however, the high frequency asynchronous modulation using a carrier having a higher frequency is performed when the modulation method is switched. This improves the resolution of DC-to-AC conversion. Accordingly, such pulsations as described above are reduced, and the alternating current waveforms are more stabilized. The above configuration can thus reduce the maximum value of the absolute value of the alternating current due to the influence of the transient current that is generated when the modulation method is switched between the asynchronous modulation and the synchronous modulation.

It is preferable that the modulated pulses of the synchronous modulation have a frequency according to the rotational speed of the rotating electrical machine (80), and the second carrier frequency (cf2) be set based on the frequency of the modulated pulses of the synchronous modulation at the time the modulation method is switched. The asynchronous modulation is typically used when the rotational speed of the rotating electrical machine (80) is low, and the synchronous modulation is used when the rotational speed of the rotating electrical machine (80) is high. Accordingly, in many cases, the rotational speed of the rotating electrical machine (80) at the time the modulation method is switched is on the relatively high rotational speed side. In asynchronous modulation using the first carrier frequency (cf1), the average frequency of the modulated pulses (modulation frequency) is the same regardless of the rotational speed of the rotating electrical machine (80). Accordingly, the number of modulated pulses per period of the electrical angle decreases as the rotational speed of the rotating electrical machine (80) increases. On the other hand, in the synchronous modulation (not only single-pulse modulation but also multi-pulse modulation), the number of modulated pulses per period of the electrical angle is the same regardless of the rotational speed of the rotating electrical machine (80), and the average frequency of the modulated pulses varies according to the rotational speed. Accordingly, when the modulation method is switched on the relatively high rotational speed side, the modulation frequency is often higher in the synchronous modulation than in the asynchronous modulation. In particular, in the case where multi-pulse modulation is performed, the number of pulses (modulation frequency) is often set so as to reduce pulsations of the alternating current and to stabilize amplitude in each phase. Accordingly, by setting the modulation frequency of the high frequency asynchronous modulation based on the modulation frequency of the synchronous modulation at the time of the modulation method is switched, pulsations of the alternating current are reduced and the amplitude in each phase can be stabilized.

In the case where the second carrier frequency (cf2) is set based on the frequency of the modulated pulses of the synchronous modulation at the time the modulation method is switched, it is preferable that the second carrier frequency (cf2) be set according to the frequency of the modulated pulses of the synchronous modulation under conditions that a maximum rated voltage is applied to a DC-side terminal of the inverter (10), the rotating electrical machine (80) outputs maximum rated torque, and the rotational speed of the rotating electrical machine (80) is a maximum rotational speed of a range in which the rotating electrical machine (80) can output the maximum rated torque. It can be said that these conditions are the worst conditions under which the inverter (10) generates the maximum amount of heat. By setting the second carrier frequency (cf2) according to the modulation frequency of the synchronous modulation under these conditions, the high frequency asynchronous modulation can be performed while satisfying conditions such as heat resistance.

In the case where the second carrier frequency (cf2) is set based on the frequency of the modulated pulses of the synchronous modulation at the time the modulation method is switched, it is preferable that the second carrier frequency (cf2) be a variable frequency, and every time the modulation method is switched, the second carrier frequency (cf2) be set according to the frequency of the modulated pulses of the synchronous modulation at the time of the switching of the modulation method. The modulation method is switched based at least on the rotational speed. In order to prevent frequent switching (hunting) of the modulation method due to fluctuations in rotational speed, the rotational speed at which the modulation method is switched from asynchronous modulation to synchronous modulation may be different from the rotational speed at which the modulation method is switched from synchronous modulation to asynchronous modulation. The modulation method may be switched according to conditions including not only the rotational speed but also output torque of the rotating electrical machine (80) and a voltage (DC link voltage (Vdc)) of the DC-side terminal of the inverter (10). Accordingly, the modulation frequency of the synchronous modulation at the time the modulation method is switched is not necessarily the same. Accordingly, the modulation frequency (second carrier frequency (cf2)) of the high frequency asynchronous modulation need not be the same. It is also preferable that the second carrier frequency (cf2) be set each time according to the modulation frequency of the synchronous modulation at the time the modulation method is switched.

It is preferable that the high frequency asynchronous modulation be continued for a period of time it takes for a current waveform to stabilize. However, in the case where a switching element (3) of the inverter (10) is switched with modulated pulses at a higher frequency, power consumption of the inverter (10) increases and heat generation thereof also increases. It is therefore preferable that execution time (T1) of the high frequency asynchronous modulation be within acceptable time during which heat generation associated with an increase in power consumption is acceptable. The higher the modulation frequency (carrier frequency) is, the shorter the acceptable time is. An acceptable temperature rise varies depending on the temperature (initial temperature) of the inverter (10) at the time the high frequency asynchronous modification is started. That is, in the case where the initial temperature is low, the acceptable temperature rise is larger than in the case where the initial temperature is high. It is therefore preferable that the higher the temperature of the inverter (10) at the time the high frequency asynchronous modulation is started is, the shorter the execution time (T1) of the high frequency asynchronous modulation is, and the higher the second carrier frequency (cf2) is, the shorter the execution time (T1) is.

In one aspect, it is preferable that the inverter (10) carry out conversion between DC power and three-phase AC power, and in the case where the rotating electrical machine control device (2) switches the modulation method between the asynchronous modulation and the synchronous modulation, the rotating electrical machine control device (2) switch the modulation method through the high frequency asynchronous modulation, and the rotating electrical machine control device (2) switch the modulation method between the high frequency asynchronous modulation and the synchronous modulation during a transition period (TP) that is defined based on a voltage phase representing a relationship among three-phase AC voltages. It is preferable that a period of the voltage phase, which corresponds to two-phase modulation in which a signal level of one phase out of the three-phase AC voltages is fixed to high level or low level and signal levels of the remaining two phases change while the signal level of the one phase is being fixed, be set as the transition period (TP).

When the modulation method is switched at the phase at which a current of one phase out of the multi-phase alternating currents has maximum amplitude, the transient current is superimposed on this maximum current. The maximum value of the absolute value of the alternating current therefore increases accordingly. Accordingly, it is preferable to avoid switching of the modulation method at such a phase and to switch the modulation method at a more preferable phase. In many cases, the inverter (10) is a voltage-controlled inverter, and it is preferable that the timing the modulation method is switched be defined by the voltage phase of the alternating voltage (approximately equivalent to the voltage phase of the modulated pulses). For example, when the number of phases on the AC side of the inverter (10) is three, there may be a phase of two-phase modulation in which the voltage level of one phase is fixed and the voltage levels of the remaining two phases change and a phase of single-phase modulation in which the voltage levels of two phases are fixed and the voltage level of the remaining one phase changes. In the phase of the single-phase modulation, a current of one of the three phases has larger amplitude and the absolute value of a base current on which the transient current is superimposed is larger. The results of experiments and simulations conducted by the inventors show that, in the case where the modulation method is switched in the phase of the single-phase modulation, the absolute value of the alternating current tends to be larger due to the influence of the transient current than in the case where the modulation method is switched in the phase of the two-phase modulation. It is therefore preferable that the modulation method be switched during the period of the voltage phase which corresponds to the two-phase modulation.

It is preferable that a period of the voltage phase, at least either immediately before or immediately after which a period during which the three-phase AC voltages are in a zero vector state is present, be set as the transition period (TP), the zero vector state being a state where the signal levels of all the three-phase AC voltages are high level or the signal levels of all the three-phase AC voltages are low level. In the case where the number of phases on the AC side of the inverter (10) is three, eight space vectors are implemented by a voltage phase of the three phases (approximately equivalent to the voltage phase of the modulated pulses). Specifically, eight space vectors, which are 100, 010, 001, 110, 101, 011, 111, and 000, can be implemented. Of these space vectors, 111 and 000 are called zero vectors, and the remaining six space vectors are called active vectors. The results of simulations conducted by the inventors show that, in the case where an active vector period is present before and after switching of the modulation method, the absolute value of the alternating current due to the influence of the transient current tends to be large. On the other hand, in the case where a zero vector period is present before and after switching of the modulation method, the absolute value of the alternating current due to the influence of the transient current tends to be small. Accordingly, it is preferable that the transition periods TP be set as described above.

It is preferable that the rotating electrical machine control device (2) switch the modulation method during a period that is included in the transition period (TP) and that includes the voltage phase at which a current of one phase out of three-phase alternating currents is zero. The three-phase alternating currents are balanced and the instantaneous values of the three-phase currents are theoretically zero. Accordingly, when a current of one of the three phases is zero, currents of the remaining two phases have the same value in the positive and negative directions. Since the three-phase currents have a phase difference of 120 degrees with respect to each other, the currents of the remaining two phases do not have maximum amplitude at the phase at which the current of one of the three phases is zero.

Accordingly, even if the transient current is superimposed on the current, the absolute value of the current serving as a base is not the maximum amplitude. It is therefore preferable to switch the modulation method during a period including a voltage phase at which a current of one phase out of the three-phase alternating currents is zero.

The invention claimed is:

1. A rotating electrical machine control device that controls an alternating current rotating electrical machine via an inverter that carries out conversion between DC power and multi-phase AC power, the rotating electrical machine control device comprising:

an electronic control unit that is programmed to:
switch a modulation method between asynchronous modulation in which switching of the inverter is controlled by modulated pulses generated based on a carrier having a first carrier frequency which is not synchronous with rotation of the rotating electrical machine and synchronous modulation in which switching of the inverter is controlled by modulated pulses generated in synchronization with rotation of the rotating electrical machine, the switching of the modulation method between the asynchronous modulation and the synchronous modulation being performed according to an operating condition of the rotating electrical machine which includes at least a rotational speed of the rotating electrical machine, and
when the electronic control unit switches the modulation method between the asynchronous modulation and the synchronous modulation, switch the modulation method through high frequency asynchronous modulation in which modulated pulses are generated based on a second carrier frequency that is a frequency higher than the first carrier frequency.

2. The rotating electrical machine control device according to claim 1, wherein
the modulated pulses of the synchronous modulation have a frequency according to the rotational speed of the rotating electrical machine, and
the second carrier frequency is set based on the frequency of the modulated pulses of the synchronous modulation at the time the modulation method is switched.

3. The rotating electrical machine control device according to claim 2, wherein
the second carrier frequency is set according to the frequency of the modulated pulses of the synchronous modulation under conditions that a maximum rated voltage is applied to a DC-side terminal of the inverter, the rotating electrical machine outputs maximum rated torque, and the rotational speed of the rotating electrical machine is a maximum rotational speed of a range in which the rotating electrical machine can output the maximum rated torque.

4. The rotating electrical machine control device according to claim 2, wherein
the second carrier frequency is a variable frequency, and every time the modulation method is switched, the second carrier frequency is set according to the frequency of the modulated pulses of the synchronous modulation at the time of the switching of the modulation method.

5. The rotating electrical machine control device according to claim 2, wherein
the higher a temperature of the inverter at the time the high frequency asynchronous modulation is started, the shorter execution time of the high frequency asynchronous modulation, and the higher the second carrier frequency, the shorter the execution time.

6. The rotating electrical machine control device according to claim 2, wherein the inverter carries out conversion between DC power and three-phase AC power, switching of the modulation method between the high frequency asynchronous modulation and the synchronous modulation is performed during a transition period that is defined based on a voltage phase representing a relationship among three-phase AC voltages, and a period of the voltage phase, which corresponds to two-phase modulation in which a signal level of one phase out of the three-phase AC voltages is fixed to high level or low level and signal levels of the remaining two phases change while the signal level of the one phase is being fixed, is set as the transition period.

7. The rotating electrical machine control device according to claim 6, wherein a period of the voltage phase, at least either immediately before or immediately after which a period during which the three-phase AC voltages are in a zero vector state is present, is set as the transition period, the zero vector state being a state where the signal levels of all the three-phase AC voltages are high level or the signal levels of all the three-phase AC voltages are low level.

8. The rotating electrical machine control device according to claim 7, wherein the electronic control unit switches the modulation method during a period that is included in the transition period and that includes the voltage phase at which a current of one phase out of three-phase alternating currents is zero.

9. The rotating electrical machine control device according to claim 6, wherein the electronic control unit switches the modulation method during a period that is included in the transition period and that includes the voltage phase at which a current of one phase out of three-phase alternating currents is zero.

10. The rotating electrical machine control device according to claim 1, wherein the higher a temperature of the inverter at the time the high frequency asynchronous modulation is started, the shorter execution time of the high frequency asynchronous modulation, and the higher the second carrier frequency, the shorter the execution time.

11. The rotating electrical machine control device according to claim 1, wherein the inverter carries out conversion between DC power and three-phase AC power, switching of the modulation method between the high frequency asynchronous modulation and the synchronous modulation is performed during a transition period that is defined based on a voltage phase representing a relationship among three-phase AC voltages, and a period of the voltage phase, which corresponds to two-phase modulation in which a signal level of one phase out of the three-phase AC voltages is fixed to high level or low level and signal levels of the remaining two phases change while the signal level of the one phase is being fixed, is set as the transition period.

12. The rotating electrical machine control device according to claim 11, wherein a period of the voltage phase, at least either immediately before or immediately after which a period during which the three-phase AC voltages are in a zero vector state is present, is set as the transition period, the zero vector state being a state where the signal levels of all the three-phase AC voltages are high level or the signal levels of all the three-phase AC voltages are low level.

13. The rotating electrical machine control device according to claim 12, wherein the electronic control unit switches the modulation method during a period that is included in the transition period and that includes the voltage phase at which a current of one phase out of three-phase alternating currents is zero.

14. The rotating electrical machine control device according to claim 11, wherein the electronic control unit switches the modulation method during a period that is included in the transition period and that includes the voltage phase at which a current of one phase out of three-phase alternating currents is zero.

* * * * *